(12) United States Patent
Maalej et al.

(10) Patent No.: US 11,252,449 B2
(45) Date of Patent: Feb. 15, 2022

(54) DELIVERING CONTENT BASED ON SEMANTIC VIDEO ANALYSIS

(71) Applicant: Charter Communications Operating, LLC, St. Louis, MO (US)

(72) Inventors: Yassine Maalej, Aurora, CO (US); Sami Makinen, Littleton, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/927,573

(22) Filed: Jul. 13, 2020

(65) Prior Publication Data

US 2022/0014804 A1    Jan. 13, 2022

(51) Int. Cl.
| | |
|---|---|
| H04N 7/10 | (2006.01) |
| H04N 7/025 | (2006.01) |
| H04N 21/234 | (2011.01) |
| G06F 16/783 | (2019.01) |
| G06F 16/732 | (2019.01) |
| G06K 9/00 | (2022.01) |

(52) U.S. Cl.
CPC ... H04N 21/23424 (2013.01); G06F 16/7328 (2019.01); G06F 16/783 (2019.01); G06K 9/00718 (2013.01); H04N 21/23418 (2013.01)

(58) Field of Classification Search
CPC ........ H04N 21/23424; H04N 21/23418; G06F 16/783; G06F 16/7328; G06K 9/00718
See application file for complete search history.

(56) References Cited

U.S. PATENT DOCUMENTS

| | | | | |
|---|---|---|---|---|
| 2017/0099526 | A1* | 4/2017 | Hua | H04N 21/2387 |
| 2018/0084291 | A1* | 3/2018 | Wei | H04N 21/4331 |
| 2019/0370980 | A1* | 12/2019 | Hollander | G06K 9/00771 |
| 2020/0037016 | A1* | 1/2020 | Gilley | H04N 7/165 |
| 2020/0137429 | A1* | 4/2020 | Strosaker | H04N 21/2668 |

OTHER PUBLICATIONS

Zamanzadeh, et al., "Semantic Advertising", DataPop Inc., University of California, 15 pages.
Nakamura, et al., "Semantic Analysis for Video Contents Extraction—Spotting by Association in News Video", 10 pages.

(Continued)

*Primary Examiner* — Kyu Chae
(74) *Attorney, Agent, or Firm* — The Marbury Law Group, PLLC

(57) ABSTRACT

Various embodiments describe methods, systems, and devices for delivering secondary video content are disclosed. Exemplary implementations may perform, at a processor of a computing device, an active video semantic analysis on a segment of a first video content presented on a viewing device. The active video semantic analysis may identify an active video first visible element visible within the segment. Also, a secondary video content, that is not directly related to the first video content, may be matched based on a prior semantic analysis on the secondary video content that identified a secondary-video first visible element therein that is associated with the active video first visible element from the segment. In addition, the secondary video content may be presented on the viewing device immediately after the segment.

25 Claims, 16 Drawing Sheets

(56) References Cited

OTHER PUBLICATIONS

Madhok, et al., "Semantic Understanding for Contextual In-Video Advertising", The Thirty-Second AAAI Conference on Artificial Intelligence (AAAI-18), pp. 8115-8116.
Wikipedia, "Targeted Advertising", https://en.wikipedia.org/wiki/Targeted_advertising, 10 pages.
Criterio, "Targeting 101: Contextual vs. Behavioral Targeting", https://www.criterio.com/insights/contextual-vs-behavioral-targeting, 7 pages, (Nov. 1, 2018).

* cited by examiner

DELIVERING CONTENT BASED ON SEMANTIC VIDEO ANALYSIS

BACKGROUND

Users watching video content are used to occasionally being presented with secondary video content, such as advertisements or follow-on videos (i.e., suggested videos) once a main video is finished. Generally, such secondary video content is selected based on a user's browsing/viewing history, the user's geographic location, popularity of the secondary video content, as part of marketing, and/or other reasons. Although such secondary video content may be targeted at a profile of the user, the content usually directs the user away from the immersive experience associated with the initial main video content. For example, if a user is watching a movie about jungle exploration, the immersive viewing experience is abruptly gone when a secondary video is presented, as an interruption or follow-on video, containing key elements therein (e.g., objects, creatures, scenes) that contrast with the immediately preceding scenes from the jungle exploration movie.

SUMMARY

Various aspects include methods for delivering secondary video content on a viewing device. One aspect of the present disclosure relates to a method for delivering secondary video content including performing, at a processor of a computing device, an active video semantic analysis on a segment of a first video content presented on a viewing device. The active video semantic analysis may identify an active video first visible element visible within the segment. Also, a secondary video content, that is not directly related to the first video content, may be matched based on a prior semantic analysis on the secondary video content that identified a secondary-video first visible element therein that is associated with the active video first visible element from the segment. In addition, the secondary video content may be presented on the viewing device immediately after the segment.

Some embodiments may include presenting the secondary video content as an interruption of the first video content, before resuming a presentation of the first video content on the viewing device until after the conclusion of the secondary video content. The segment of the first video content may take place during the first video content within 3 to 5 minutes before the interruption. The active video semantic analysis may further identify an active video second visible element, within the segment, that interacts with the active video first visible element. The active video semantic analysis may further identify a plurality of active video visible elements, within the segment. The active video semantic analysis may further identify an interaction between the active video first visible element and at least one other active video elements visible within the segment.

Some embodiments may include performing a secondary video semantic analysis of a plurality of secondary video content candidates. Also, a preferred weighting may be allotted to any of the plurality of secondary video content candidates that includes the secondary-video first visible element, wherein the matching secondary video content includes a highest weighting.

Some embodiments may adjust the weighting of a select one or more of the plurality of secondary video content candidates, based on secondary modifiers not related to the content of the select one or more of the plurality of secondary video content candidates. Adjusting the weighting of a select one or more of the plurality of secondary video content candidates may be based on a user input/preference that is associated with the select one or more of the plurality of secondary video content candidates. Adjusting the weighting of a select one or more of the plurality of secondary video content candidates may be based on metadata in at least one of the segment of the first video content or the select one or more of the plurality of secondary video content candidates.

Some embodiments may perform a semantic analysis of a plurality of secondary video content candidates. Also, a preferred weighting may be allotted to any of the plurality of secondary video content candidates associated with a category of element to which the secondary-video first visible element belongs, wherein the matching secondary video content is associated with the category of element.

Some embodiments may include performing a semantic analysis of a plurality of secondary video content candidates. The semantic analysis of both the segment of the first video content and each of the plurality of secondary video content candidates may be configured to identify one or more active video second visible elements visible therein. The matching of the secondary video content may include the most active video second visible elements in common with the segment of the first video content. An audio content analysis may be performed of the segment of the first video content to determine at least one key audio element of the first video content, wherein the matching secondary video content is associated with the at least one key audio element. A text analysis may be performed on text visible in the segment of the first video content to determine at least one key textual element of the first video content. The matching secondary video content may be associated with the at least one key textual element.

Further aspects may include a computing device having a processor configured to perform one or more operations of the methods summarized above. Further aspects may include a non-transitory processor-readable storage medium having stored thereon processor-executable instructions configured to cause a processor of a computing device to perform operations of the methods summarized above. Further aspects include a computing device having means for performing functions of the methods summarized above.

BRIEF DESCRIPTION OF THE DRAWINGS

The accompanying drawings, which are incorporated herein and constitute part of this specification, illustrate exemplary embodiments of the claims and together with the general description given above and the detailed description given below, serve to explain the features of the claims.

DETAILED DESCRIPTION

Figure 1A:
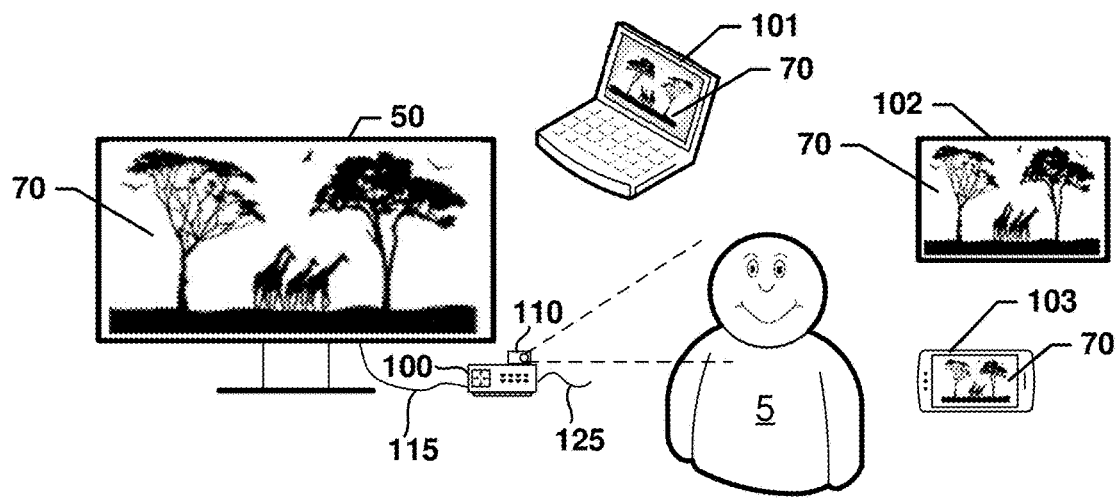
FIGS. 1A-1C are schematic diagrams conceptually illustrating a system for delivering primary and secondary video content to a television with a set-top box in accordance with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods, systems, and devices for delivering secondary video content. Exemplary implementations may perform a semantic analysis on main video content being viewed by a target consumer. A short video segment of the main video content, taking place either immediately before a scheduled interruption or immediately before the very end of the main video content, may be selected for the semantic analysis. The semantic analysis identifies and labels elements, such as people, creatures, structures, and/or objects in the short video segment of the main video content. By analyzing the short video segment just before a break in the main video content, the results of the analysis will pertain to the most recently viewed video content. The results of the semantic analysis and labeling may be used to match the short video segment to another piece of short video content, such as an advertisement or other video. The matching may be performed by a scoring engine that calculates a coherency between the contents of the short video segment and the contents of each of a pool of eligible secondary video content. By previously performing a semantic analysis on each video in the pool, the elements therein may be used by a matching engine to select the most coherent secondary video content to present immediately after the selected short video segment of the main video content concludes. The matching engine may additionally consider user feedback (i.e., input), metadata (i.e., information transmitted along with the video stream), demographics, geographic location of the display device used by the target consumer, secondary modifiers (e.g., values added by the distributor and/or advertisers), and supplemental analysis of additional element of the primary or main video (e.g., on-screen text or voice-to-text analysis). Each of the considerations may be used to weigh the various secondary video content against one another to find the best match for the short video segment from the main video content. The goal is to achieve the best content consistency between the short video segment from the main video content and a selected secondary video content. The higher the weighting for a secondary video content as it pertains to the short video segment from the main video content, the more likely that secondary video content will be a coherent match to the short video segment (i.e., better content consistency). The various embodiments may be used as an add-on service/system to a content distributor network having a pool of video content for distributor, such as advertisements or promotional videos.

As used herein, the term "video content" refers to information and expressions thereof that are expressed through a visual display medium or multimedia, including but not limited to video recordings or streaming services broadcast or otherwise transmitted to end-users and/or consumers. Video content may include multimedia content, a video from a video-sharing website/service or social network, podcasts, news, music, or a television program, show, series, etc., that is provided by a programmer (e.g., Turner Broadcasting®, ESPN®, Disney®, Viacom®, etc.) to a content distributor network (e.g., Charter®, Comcast®, DirecTV®, Sling® TV etc.) for Internet Protocol (IP) streaming (e.g., adaptive bit rate (ABR) streaming, such as Apple Hypertext Transfer Protocol (HTTP) Live Streaming (Apple HLS), Dynamic Adaptive HTTP (DASH), etc., or any other type IP streaming) on a channel provided by the content distributor network and associated with that programmer Programmers (e.g., Turner Broadcasting, ESPN, etc.) may encode (e.g., using metadata) and package video content for delivery by the content distributor networks to consumers (also referred to as customers or viewers) via IP streaming services offered by the content distributor networks (e.g., Charter®, Comcast®, DirecTV®, Sling® TV etc.). Through the consumer's computing device, a consumer (also referred to as a customer, viewer, or user) may select video content offered by the consumer's respective content distributor network (i.e., the content distributor network providing service to the consumer's computing device) to output (i.e., play, view, consumed) the video content provided by the programmer Such selected video content is referred to herein as "primary video content." In addition, from time to time, the primary video content may be interrupted and/or followed by what is herein referred to as "secondary video content," which is not directly related to the primary video content. For example, the secondary video content may include advertisements, promotional videos, and other video content not directly selected by the target customer.

As used herein, the term "computing device" is used to refer to any one or all of personal computers, portable computing devices, rack mounted computers, routers, mobile devices, cellular telephones, smart phones, smart watches, smart buttons, smart appliances, personal or mobile multi-media players, personal data assistants (PDAs), tablet computers, smart books, palm-top computers, desk-top computers, wireless electronic mail receivers, cellular telephones, wireless gaming controllers, streaming media players (such as, ROKU®), smart televisions, DVRs, modems, satellite or cable set top boxes, smart remote control devices (i.e., television remote controls with sufficient processing capabilities), and similar electronic devices which include a programmable processor and memory and circuitry for providing the functionality described herein.

The various embodiments are described herein using the term "server" to refer to any computing device capable of functioning as a server, such as communications server, a name server, a master exchange server, web server, mail server, document server, database server, route server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server-type functionality that can be implemented on a computing device thereby enabling it to function as a server only to the extent necessary to provide the functionality described herein.

In accordance with various embodiments, a processor of a computing device may perform an active video semantic analysis on a segment of a first video content presented on a viewing device. The semantic analysis identifies an active video first visible element within the segment. Using the active video semantic analysis, a secondary video content, not directly related to the first video content, may be matched to the segment of the first video content based on a prior semantic analysis on the secondary video content that identified a secondary-video first visible element therein that is associated with the active video first visible element from the segment. The secondary video content may then be presented on the viewing device immediately or almost immediately after the segment. The presentation of the secondary video content as an interruption of the first video content, before resuming the presentation of the first video content on the viewing device and/or after the end of the first video content. The segment of the first video content, upon which the active video semantic analysis is performed, will correspond to a short portion of the first video content immediately before the secondary video content will be presented on the viewing device.

Figure 1B:
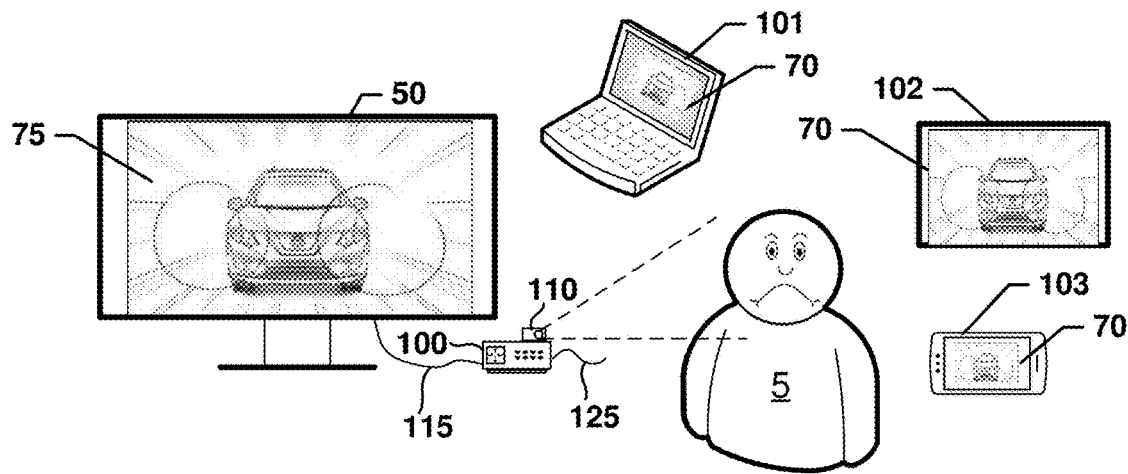
Figure 1C:
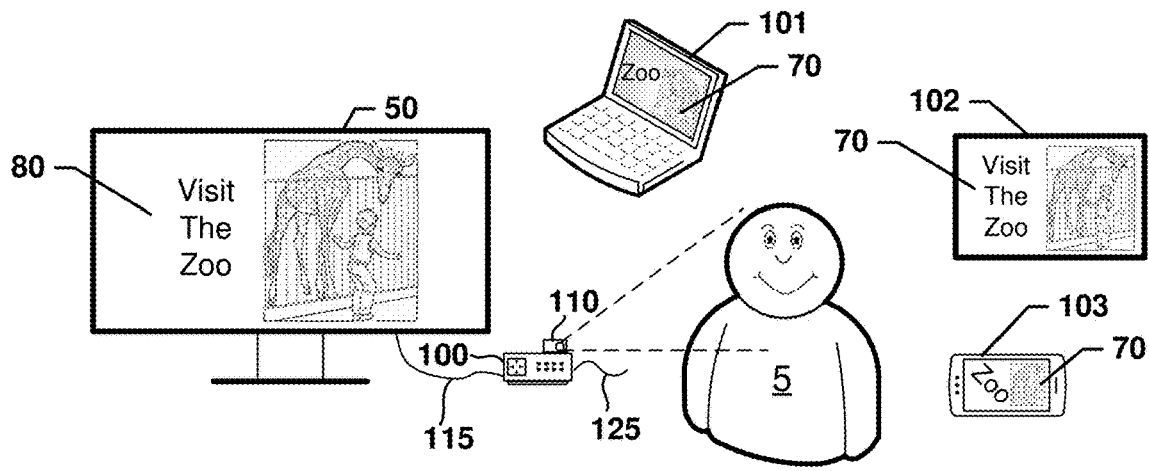

FIGS. 1A-1C illustrate an example of computing devices 100, 101, 102, 103 configured to deliver both primary video content 70 and secondary video content 75, 80 to a target customer 5 in accordance with various embodiments. The various embodiments are described herein with regard to a scenario in which the target customer 5 is watching video content on only one of the computing devices 100, 101, 102, 103. However, the target customer 5 may be using more than one of the computing devices 100, 101, 102, 103.

The computing device 100, which is in the form of a set-top-box, may be connected to a viewing device 50 (e.g., a television set) with a visual display for the target customer 5 to view the primary and secondary video content 70, 75, 80. The alternative computing devices 101, 102, 103 may include a laptop computer 101, tablet computer 102, and a smartphone 103. Each of the alternative computing devices 101, 102, 103 may include a display, which operates as a viewing device for delivering both the primary video content 70 and the secondary video content 75, 80 to the target customer 5 in accordance with various embodiments. The secondary video content 75, 80 (e.g., an advertisement or other promotion) may be presented on the viewing device 50, or directly on the display of any of the alternative computing devices 101, 102, 103, as a brief interruption of the primary video content 70 (e.g., a movie, television series, or other main video content) or may be presented as a follow-on video after the primary video content 70 is complete. The secondary video content 75, 80 may not be directly related to the primary video content 70. The primary and secondary video content 70, 75, 80 may be delivered to the alternative computing devices 101, 102, 103 through a wired and/or wireless connection to a content distributor network. For example, the primary and secondary video content 70, 75, 80 may be delivered using an internet browser or dedicated streaming application (i.e., an App) run on the alternative computing devices 101, 102, 103.

The computing devices 100, 101, 102, 103 may include one or more sensors, such as a camera 110, microphone, etc., which may be used to get feedback from the target customer 5. In this way, using facial/object recognition techniques, the computing device 100 may receive imaging from the camera 110 to capture and infer gestures, facial expressions, and other feedback from the target customer 5, which may indicate a like or dislike of the secondary video content 75, 80. Alternatively, the target customer 5 may provide verbal feedback or feedback through another data input source. The feedback collected from each individual target customer 5 will be used to generate a customized viewing experience for that target customer 5, which may be different from the viewing experience presented to other customers.

In FIG. 1A, the target customer 5 has selected and is happily watching the primary (i.e., first or main) video content 70, which happens to be about an African safari. The target customer 5 is immersed in the viewing experience of seeing majestic animals, such as giraffes, grazing, running, and playing in an expansive savanna.

FIG. 1B, illustrates an example of how the customer experience can be abruptly changed when an unrelated secondary video content 75 is presented on the viewing device 50 as a brief interruption to the primary video content (e.g., 70). The substance of the unrelated secondary video content 75 is so unrelated to the creatures, scenery, and context of the primary video content, that the unrelated secondary video content 75 may be jarring to the viewer (e.g., target consumer 5) and detracts to the customer experience.

FIG. 1C, in contrast to FIG. 1B, illustrates an example of how the customer experience can be maintained when a contextually-related secondary video content 80, as shown in FIG. 1C, is presented on the viewing device 50 as a brief interruption to the primary video content (e.g., 70), rather than the unrelated secondary video content (e.g., 75) in FIG. 1B. The substance of the contextually-related secondary video content 80, which includes at least one common element, such as the giraffes, is designed to provide a smooth or more gentle transition in the viewing experience of the target consumer 5. Rather than break the interest of the target consumer 5 in the primary video content, the contextually-related secondary video content 80 may maintain that interest.

Figure 3A:
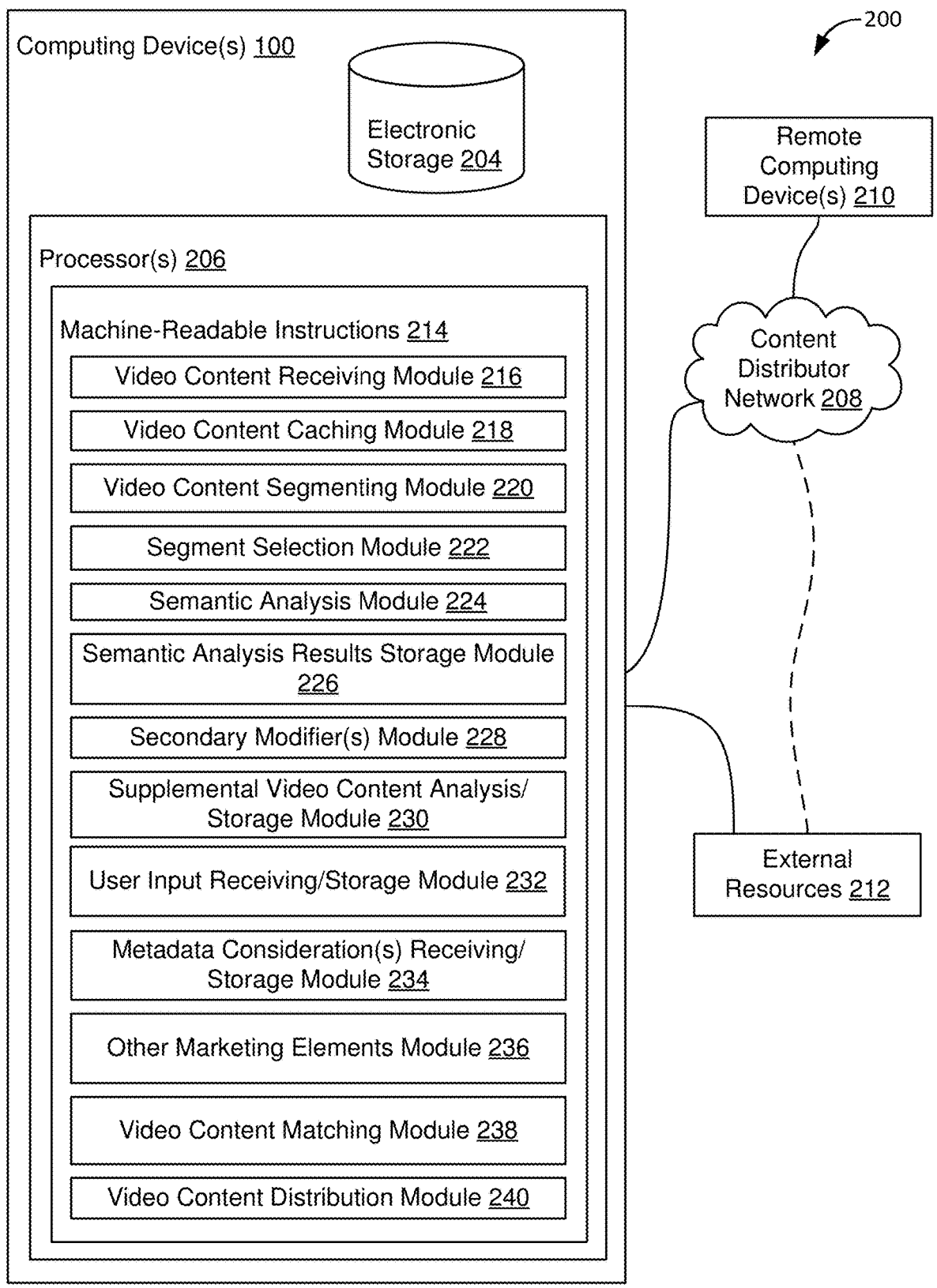
FIG. 3A is a component block diagram illustrating computing systems that may be configured to deliver secondary video content in accordance with various embodiments.
Figure 3B:
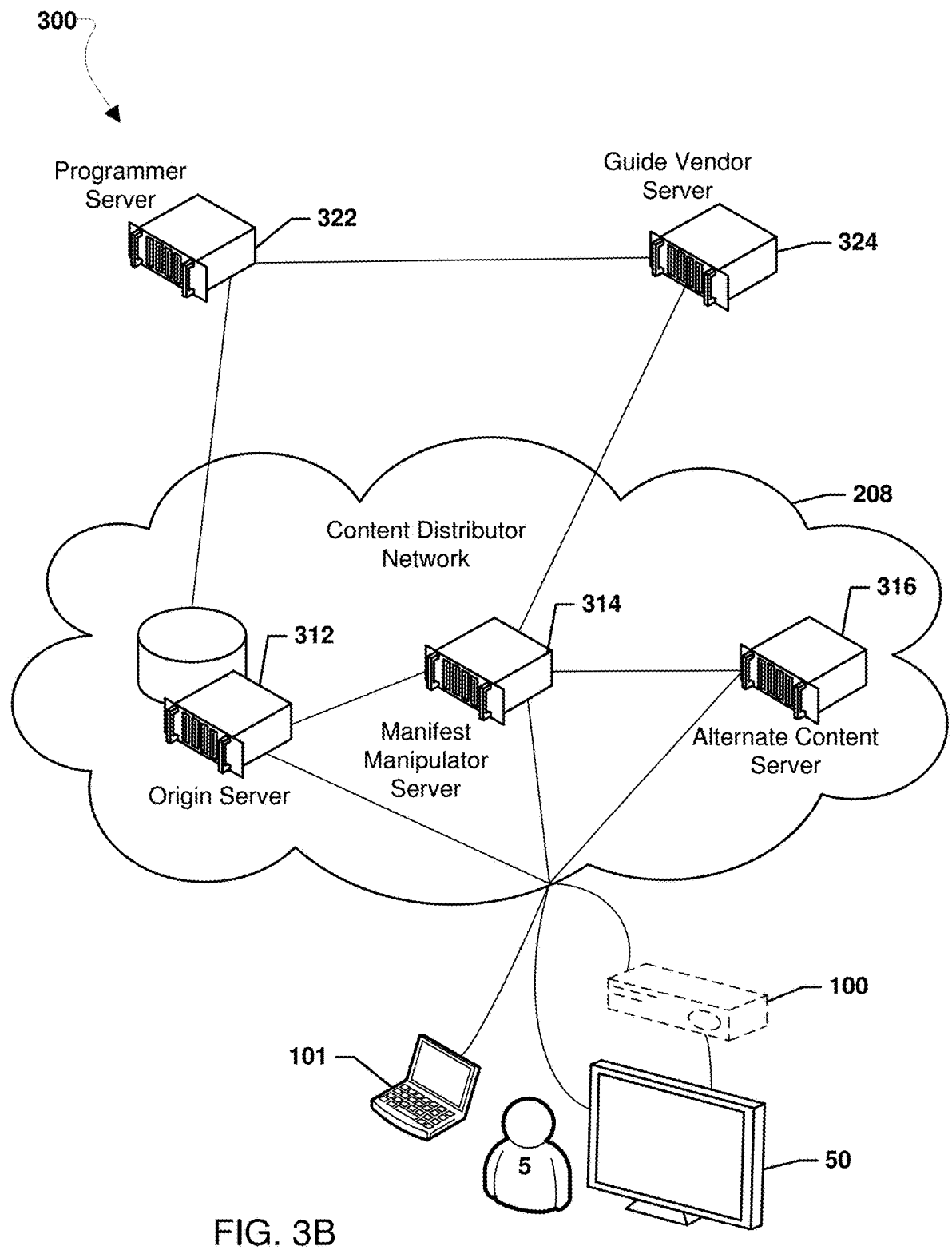
FIG. 3B is a system block diagram of an IP network for distributing primary and secondary video content suitable for use with various embodiments.

The computing devices 100, 101, 102, 103 may represent one or more computing devices including local computing devices (e.g., a television, set-top box, gaming console, personal computer, laptop, tablet, and the like), distributor network computing devices (e.g., origin server, manifest manipulator server, alternate content server, and the like, such as from a content distributor network 208 illustrated in FIGS. 3A and 3B), programmer computing devices, guide vendor computing devices, and/or other remote computing devices.

The viewing device 50 may be coupled to the computing device 100 through a wired connection 115. Alternatively, or additionally, the viewing device 50 may be coupled to the computing device 100 by a wireless connection (e.g., Wi-Fi, Bluetooth, etc.). As a further alternative, the viewing device 50 may be coupled to the computing device 100 through an intermediate device, such as a router, using a wired and/or wireless connection. The viewing device 50 may be a television, personal computer, smartphone, tablet, monitor, or other computing device configured to present video content supplied via the computing device 100 from various sources by way of another wired connection 125, a wireless connection, or a combination thereof. Also, the viewing device 50 may be controlled, such as through a remote controller, by the target consumer 5 to control functions of the viewing device 50 (e.g., volume, power, etc.) and/or the computing device 100, such as channel changing and/or operations related to the presentation of video content.

The communication links 115, 125 may use a variety of wireless (e.g., 5g-NR(u), LTE, Citizens Broadband Radio Service (CBRS), etc.) and/or wired networks (e.g., Ethernet, TV cable, telephony, fiber optic and other forms of physical network connections) that may use one or more communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

FIGS. 2A-2F illustrate examples of still frames 151, 152, 153, 154, 155, 156 from segments of different primary video content, upon which semantic analysis has been performed in accordance with various embodiments. With reference to FIGS. 1A-2F, a processor of a computing device may perform an active video semantic analysis on a segment of primary video content. The segment of each primary video content, used for the active video semantic analysis, may consist of a short video clip (e.g., 3-5 seconds long) taking place just minutes (e.g., 3-5 minutes) before a selected secondary video content will be presented. The active video semantic analysis refers to the semantic analysis performed on the primary video content, as opposed to the prior semantic analysis performed on each of a pool of secondary video content (i.e., a plurality video content, each of which may be selected as a secondary video content for presentation to a target customer). The prior semantic analysis on numerous videos (i.e., the pool of secondary video content) may provide a set (or sets) of elements and/or categories of elements used for matching to the elements identified from the primary video content. In this way, the identification of elements or categories of elements through the active video semantic analysis may be limited to those elements or categories of elements included in the set compiled from the prior semantic analysis.

Figure 2A:
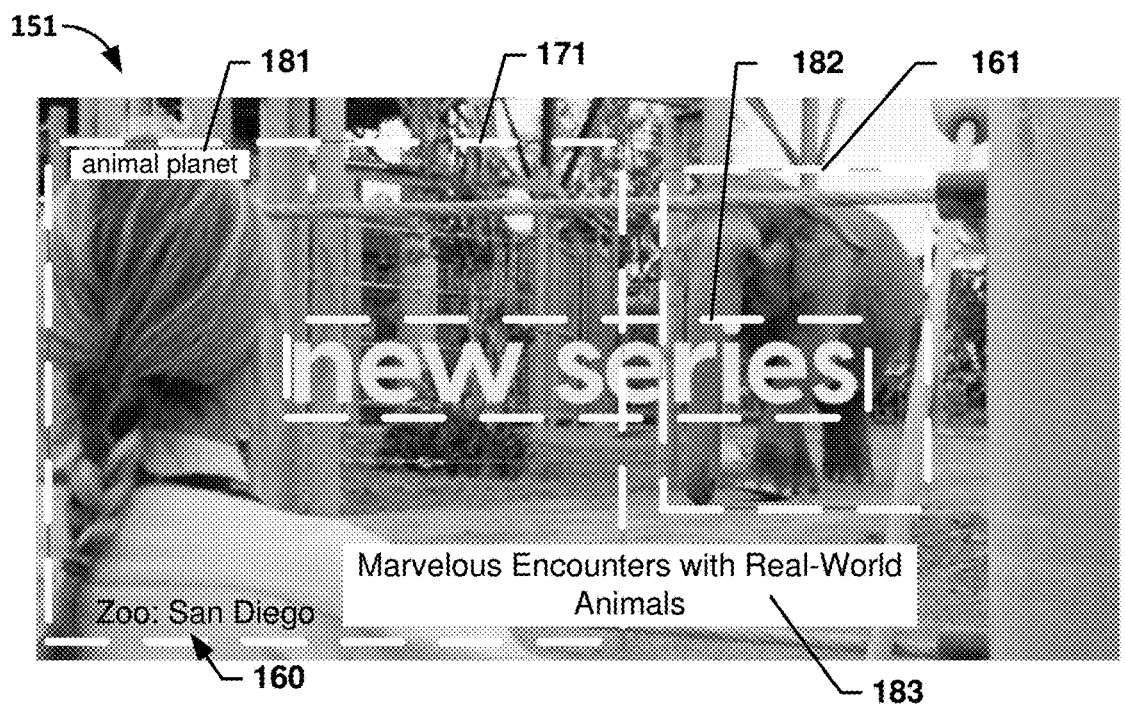
FIGS. 2A-2F are illustrative examples of still frames from segments of different primary video content, upon which semantic analysis has been performed in accordance with various embodiments.

FIG. 2A shows a third active video still frame 153 from a new television series titled "Zoo: San Diego" 160. The first active video still frame 151 is from a first segment (e.g., 3 seconds long) of this new television series, several minutes (e.g., 4 minutes) before a commercial break (i.e., an interruption during which an advertisement will be presented). The active video semantic analysis on the first segment may identify an active video first visible element 161, which may be identified as an "elephant" that is visible within the segment. Additionally, the active video semantic analysis may identify an active video second visible element 171, which may be identified as a "woman" that is visible within the segment. Optionally, a supplemental video content analysis may be performed on other elements of the first segment, such as the displayed text elements 181, 182, 183. In this case, since the first and third displayed text elements 181, 183 include the words "animal" and "animals," such an emphasis (i.e., a repeated word) may be pertinent when finding a matching secondary video content. The elements 'elephant,' 'woman,' and/or 'animal' may be associated with the categories of "Zoos" and/or "Travel." Thus, a top criteria for matching secondary video content may be that the selected secondary video content also be associated with the categories "Zoos" and "Travel."

Figure 2B:
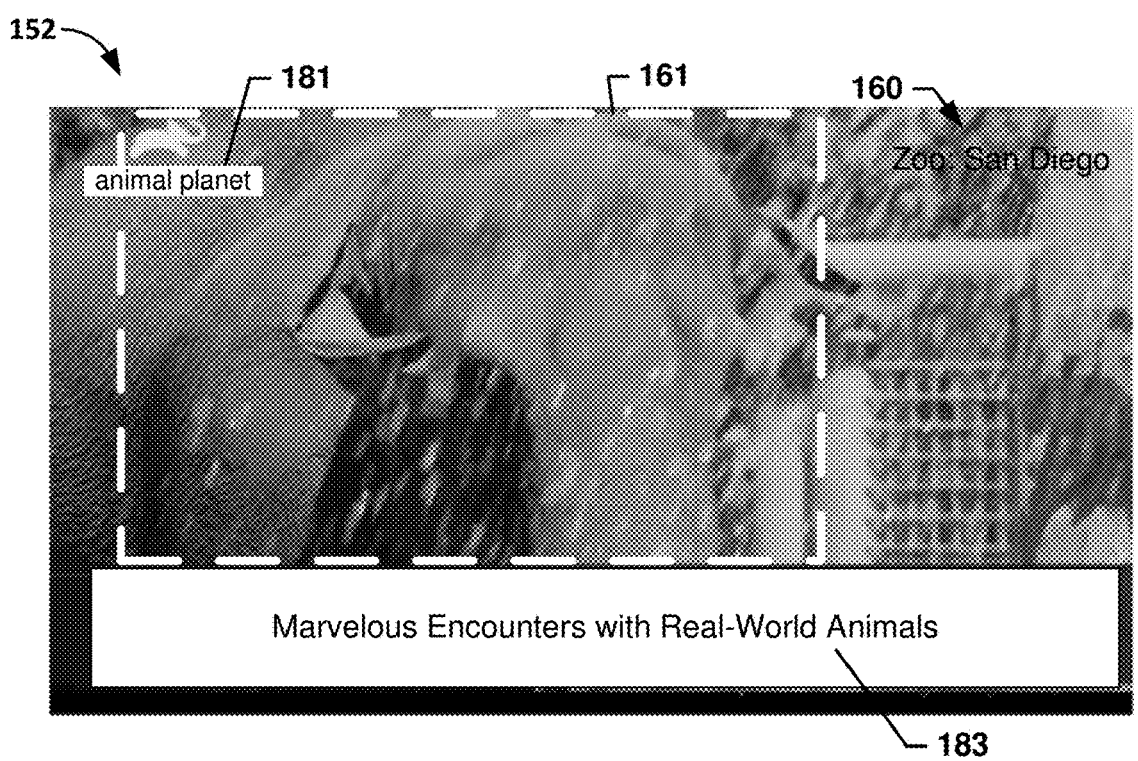

FIG. 2B shows a second active video still frame 152 from a different segment of the series "Zoo: San Diego" 160, referred to with regard to FIG. 2A. The second active video still frame 152 is from a second segment of the new television series. The active video semantic analysis on the second segment may identify the same active video first visible element 161 (i.e., the "elephant"). However, unlike the first segment, no other visual element may be identifiable in the second segment. The element 'elephant,' by itself, may be associated with the categories of "Zoos" and/or "Travel." Thus, a top criteria for matching secondary video content with this different segment may be that the selected secondary video content also be associated with the categories "Zoos" and "Travel." In addition, if the optional supplemental video content analysis is used, the word "animal" may once again be recognized from the displayed text 181, 183, which may also be associated with the categories "Zoos" and/or "Travel," thus increasing the relevance for matching in those categories.

Figure 2C:
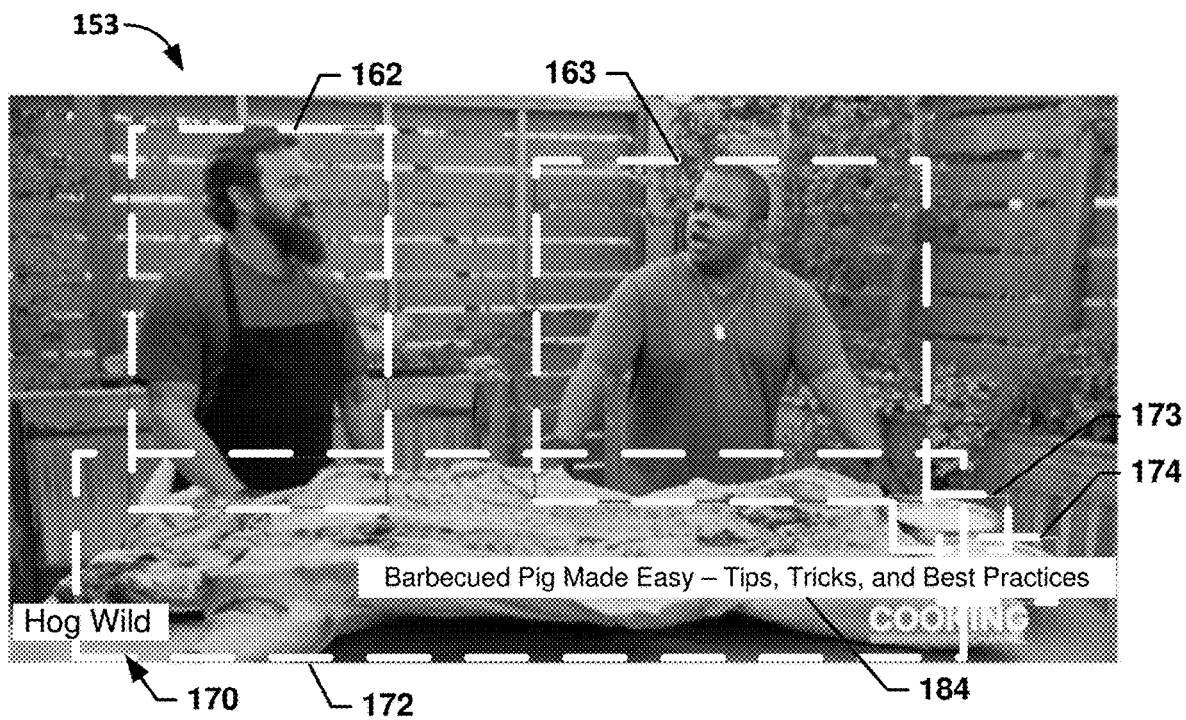

FIG. 2C shows a third active video still frame 153 from a different series titled "Hog Wild" 170. The third active video still frame 153 is from a third segment (e.g., 5 seconds long), just a few minutes (e.g., 3 minutes) before a commercial break therein. The active video semantic analysis on the third segment may identify more than one active video first visible element 162, 163, which may be identified as "men" that are visible within the segment. Additionally, the active video semantic analysis may identify more than one active video second visible element 173, 174, which may be identified as "plates" that are visible within the segment. Further, the active video semantic analysis may identify an active video third visible element 172, which may be identified as "pig" within the segment. The elements 'men,' plates,' and/or 'pig' may be associated with the categories of "Restaurants" and "Farming," and "Food." Thus, top criteria for matching secondary video content may be that the selected secondary video content also be associated with the categories "Restaurants," "Farming," and "Food." Optionally, a supplemental video content analysis may be performed on other elements of the third segment, such as the fourth displayed text element 184. In this case, since the fourth displayed text element 184 includes the words "Barbecued" and "Pig," an emphasis may be pertinent when finding a matching secondary video content that additionally relates to the category of "Barbecue."

Figure 2D:
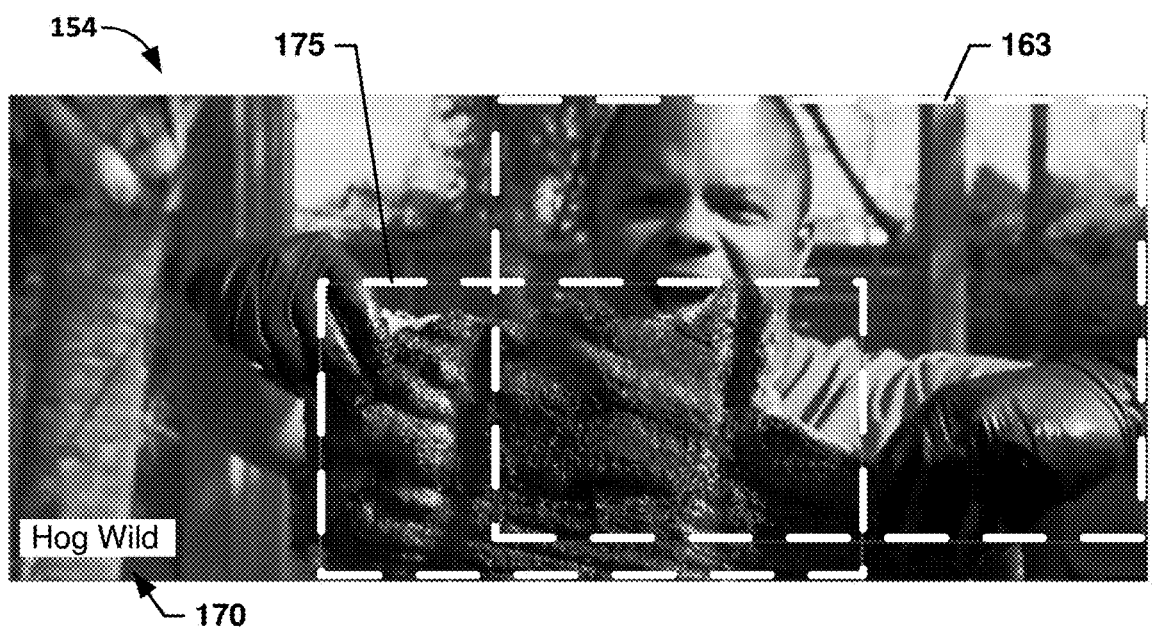

FIG. 2D shows a fourth active video still frame 154 from the series "Hog Wild" 170, referred to with regard to FIG. 2C. The fourth active video still frame 154 is from a second segment of the series. The active video semantic analysis on the second segment may identify one of the same active video first visible element 16 (i.e., the "man"). However, unlike the first segment, the only other visual element that may be identified in the second segment 175 is the "meat." The elements 'man' (or men) along with 'meat' may be associated with the categories of "Food," "Hunting," and/or "Seasoning." Thus, top criteria for matching secondary video content with this different segment may be that the selected secondary video content also be associated with the categories "Food," "Hunting," and/or "Seasoning."

Figure 2E:
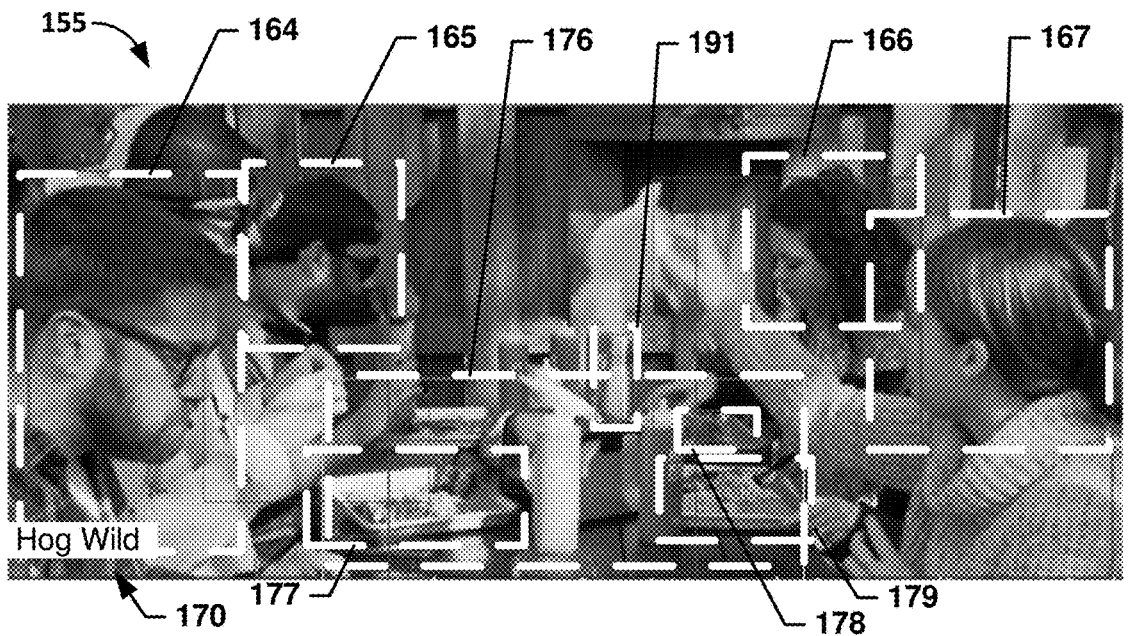

FIG. 2E shows a fifth active video still frame 155 from the series "Hog Wild" 170, referred to with regard to FIGS. 2C and 2D. The active video semantic analysis on the fifth segment may identify more than one active video first visible element 164, 165, which may be identified as "men" that are visible within the segment. Additionally, the active video semantic analysis may identify more than one active video second visible element 166, 167, which may be identified as "women" that are visible within the segment. Further, the active video semantic analysis may identify several active video third visible elements 172, 173, 174, 175, 176, which may be identified as "food" and an active video fourth visible element 177, which may be identified as "drink" within the segment. The elements 'men,' 'women,' food,' and/or 'drink' may be associated with the categories of "Restaurants" and "Food." Thus, top criteria for matching secondary video content may be that the selected secondary video content also be associated with the categories "Restaurants" and "Food."

Figure 2F:
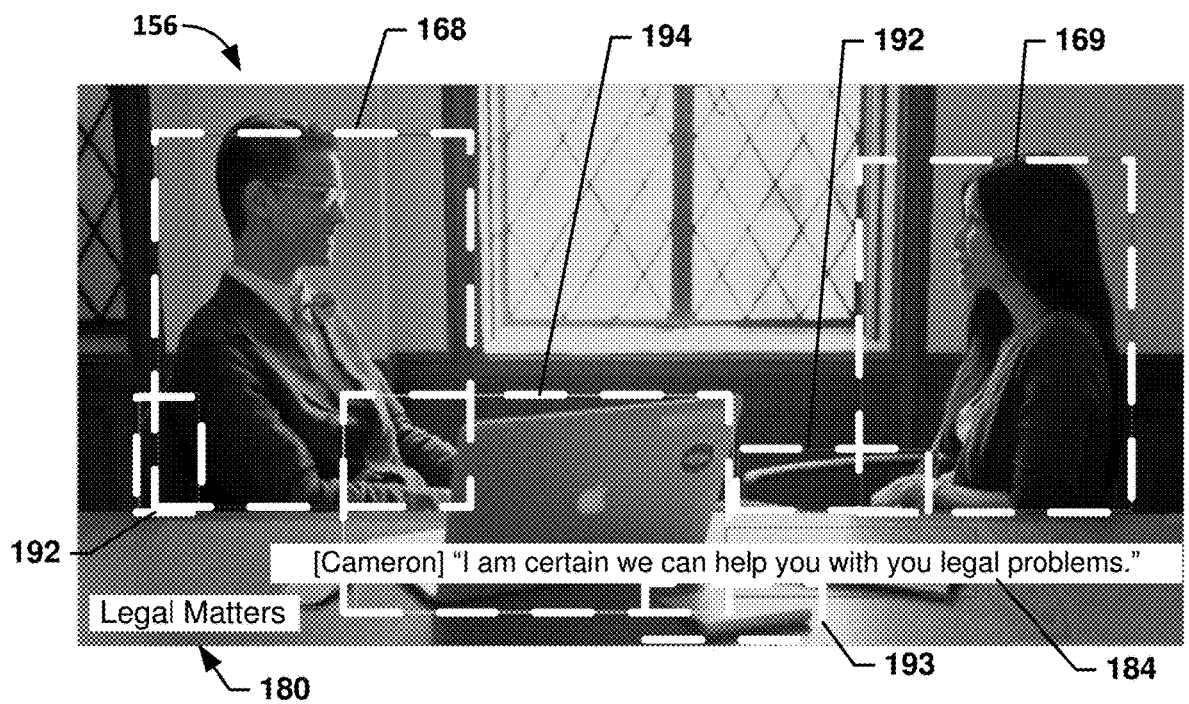

FIG. 2F shows a sixth active video still frame 156 from a movie titled "Legal Matters" 180. The sixth active video still frame 156 is from a first segment (e.g., 4 seconds long) that takes place minutes (e.g., 5 minutes) before the very end of the movie, which is when an advertisement is scheduled to be presented. The active video semantic analysis on the first segment may identify an active video first visible element 168, which may be identified as a "man" that is visible within the segment. Additionally, the active video semantic analysis may identify an active video second visible element 169, which may be identified as a "woman" that is visible within the segment. Additionally, the active video semantic analysis may identify numerous active video third visible elements 192, 193, 194, which may be identified as "chairs," "mouse, electronic," and "computer," respectively. Optionally, a supplemental video content analysis may be performed on other elements of the first segment, such as the closed-caption text 184, "which includes the word "legal." The elements 'man,' 'woman,' and/or 'chairs,' 'mouse, electronic,' and 'computer' may be associated with the categories of "Electronics" and/or "Furniture," plus the word 'legal' may be associated with the category of "Legal." Thus, top criteria for matching secondary video content may be that the selected secondary video content also be associated with the categories "Electronics," "Furniture," and "Legal."

FIG. 3A is a component block diagram illustrating computing system 200 configured for delivering contextually appropriate secondary video content in accordance with various embodiments. In some embodiments, the computing system 200 may include one or more computing device(s) 100 that may include an electronic storage 204, one or more processors 206, and/or other components. In addition, the computing system 200 may be configured to work and communicate with remote computing device(s) 210 and/or external resources 212 through wired and/or wireless connections via one or more content distributor networks 208. Thus, the computing device(s) 100 may include communication lines, or ports, to enable the exchange of information with the content distributor networks 208, the remote computing device(s) 210, the external resources 212, and/or other computing platforms.

With reference to FIGS. 1A-3A, the illustration of the computing device(s) 100 is not intended to be limiting. The computing device(s) 100 may include a plurality of hardware, software, and/or firmware components operating together to provide the functionality attributed herein to the computing device(s) 100.

The electronic storage 204 may comprise non-transitory storage media that electronically stores information. The electronic storage media of the electronic storage 204 may include one or both of system storage that is provided integrally (i.e., substantially non-removable) with the computing device(s) 100 and/or removable storage that is removably connectable to the computing device(s) 100 via, for example, a port (e.g., a USB port, a firewire port, etc.) or a drive (e.g., a disk drive, etc.). Electronic storage 204 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 204 may include one or more virtual storage resources (e.g., cloud storage, a virtual private network, and/or other virtual storage resources). Electronic storage 204 may store software algorithms, information determined by processor(s) 206, information received from the computing device(s) 100, information received from the content distributor network 208, the remote computing device(s) 210, external resources 212 and/or other information that enables the computing device(s) 100 to function as described herein.

The processor(s) 206 may be configured to provide information processing capabilities in the computing device(s) 100. As such, processor(s) 206 may include one or more of a digital processor, an analog processor, a digital circuit designed to process information, an analog circuit designed to process information, a state machine, and/or other mechanisms for electronically processing information. Although processor(s) 206 is/are shown in FIG. 2 as a single unit, this is for illustrative purposes only. In some embodiments, processor(s) 206 may include a plurality of processing units. These processing units may be physically located within the same device, or one or more of the processor(s) 206 may represent processing functionality of a plurality of devices, remote from one another and operating in coordination.

The content distributor network 208 may be operated by a content distributor (e.g., Charter®, Comcast®, DirecTV®, Sling® TV etc.) and may provide video content, such as television services via IP streaming (e.g., ABR streaming, such as Apple HLS, DASH, etc., or any other type IP streaming) to consumers, such as the target consumer 5. The content distributor network 208 may be part of an IP network that various interconnected computing devices, such as an origin/primary content server, manifest manipulator server, and secondary video content server. Via connections (wired and/or wireless) with one another, the origin/primary content server, the manifest manipulator server, and the secondary video content server may exchange data with one another.

The remote computing device(s) 210 may be a server that provides content for viewing by consumers, such as the target consumer 5, via the content distributor network 208. For example, remote computing device(s) 210 may provide programmer content (i.e., video content) to the content distributor network 208. An encoder and packager at the remote computing device(s) 210 or as part of the content distributor network 208 may format and/or store the video content (e.g., video content along with content-type metadata) for IP streaming. The content distributor network 208, the remote computing device(s) 210, and/or the external resources 212, may include a server for a separate content delivery network (CDN) service, such as Akamai®, Amazon®, Netflix®, Hulu®, Vudu®, HBOGo®, etc., to which the content distributor network 208 operator or programmer offloads content storage and delivery.

The external resources 212 may include a separate computing device, such as a camera (e.g., 110 in FIGS. 1A-1C), directly connected (through wired or wireless connections) to the computing device(s) 100 or via a connection to the content distributor network 208. Such a separate computing device may be used to provide user input, such as to capture gestures, facial expression, or other input that provides feedback (e.g., likes or dislikes) from the target customer (e.g., 5).

The computing device(s) 100 may be configured by machine-readable instructions 214. Machine-readable instructions 214 may include one or more instruction modules. The instruction modules may include computer program modules. The instruction modules may include one or more of a video content receiving module 216, a video content caching module 218, a video content segmenting module 220, a pre-interruption segment selection module 222, a semantic analysis module 224, a semantic analysis results storage module 226, a secondary modifier(s) module 228, a supplemental video content analysis module 230, a user input receiving/storage module 232, a metadata considerations receiving/storage module 234, other marketing elements module 236, a video content matching module 238, a video content distributor module 240, and/or other instruction modules.

The video content receiving module 216 may be configured to receive, at a processor 206 of the computing device 100, video content from any source (e.g., the content distributor network 208, the remote computing device(s) 210, and/or the external resources 212) for viewing by the target consumer (e.g., 5). The video content receiving module 216 may include a radio frequency (RF) transceiver and/or a network transceiver, such as a network access port for establishing wired or wireless network interface connections with a communication network, such as a local area network coupled to other computing devices and routers/switches, the Internet, the public switched telephone network, and/or a cellular network. Also, the video content receiving module 216 may be coupled to and use the video content caching module 218 to store the received video content in memory. The various modules (e.g., 216-240) described herein with regard to the machine-readable instructions 214 of the processor(s) 206 of the computing device 100 may be included and/or executed from any one or more of the other computing devices described herein (e.g., 50, 101, 102, 103, 210, 312, 314, 316, 322, 324).

The video content segmenting module 220 may be configured to divide the received video content into smaller segments that may be used for semantic analysis. Each segment may have a designated duration, such as 3, 4, or 5 seconds of video.

The duration of each segment should be long enough for a semantic analysis to be conducted, but short enough to maintain a cogent connection between the content of that segment and the secondary video content presented to the target consumer immediately thereafter. With a predetermined duration for the segments, the video content segmenting module 220 may designate or actually divide the primary video content into a number of segments having the predetermined duration. The video content segmenting module 220 may store the video segments in the video content caching module 218 and/or label with partitions the video content already received and stored therein.

The segment selection module 222 may be configured to determine which segment or segments of a primary video content will be semantically analyzed. The segment selection module 222 may access metadata associated with the primary video content at the content distributor network (e.g., 208) or elsewhere in an available IP network, as well as the secondary video content, to determine when the secondary video content should be played relative to the primary video content. Rather than analyzing the entire stream of the primary video content or all segments thereof, various embodiment only analyze each segment of the primary video content that precedes an interruption in or the conclusion of the primary video content. In this way, if a commercial break is planned 30 minutes into a live broadcast of a sporting event (i.e., the primary video content), the segment selection module 222 may select the last segment of the live broadcast to start before that commercial break. If more than one break is planned, the segment selection module 222 may determine which segments of the primary video content precede each of those breaks. For example, at least one secondary video content may be designated to start play every 15 minutes during the primary video content, which is a live sporting event. This may cause the segment selection module 222 to select each segment that ends just before each 15 minute interval.

The semantic analysis module 224 may be configured to identify elements visible within video content using image processing. The image processing may be used on a pool of secondary video content (e.g., 410 in FIGS. 4A and 4B) for later matching to a segment of a primary video content to which the image processing is also performed. Applying deep learning and machine learning algorithms with neural networks, a processor 206 of a computing device 100 may apply computer vision techniques to identify elements in images or video. The semantic analysis performed by the semantic analysis module 224 may be applied to primary video content, as well as secondary video content. The semantic analysis module 224 may focus on key elements, which are the dominant elements or those appearing most consistently throughout a video segment. Those elements may include people, creatures, objects, structures, and other visible elements. The identification of those elements may be with varying degrees of specificity. For example, the semantic analysis module 224 may determine that a video segment contains a woman (i.e., a first visible element) dressed in a bathing suit, without needing to determine the identity of that individual. Also, the analysis may further identify a beach (i.e., a second visible element) that the woman is interacting (i.e., walking on), without determining the precise name or location of that beach. Alternatively, the semantic analysis module 224 may determine that a different video segment contains racecars (i.e., a group of first visible elements), but determines further details, such as that those racecars are Formula One cars. In addition, the semantic analysis may further identify a race course (i.e., a second visible element), particularly the famous Autodromo Nazionale di Monza, in Monza, Italy.

In addition to identifying elements visible within video content, the semantic analysis module 224 may classify and/or categorize the identified elements. For example, the identified elements may be associated with categories, like travel, vehicles, merchandise, apparel, appliances, etc. The classification and/or categorization may be used by match video content, such as by the video content matching module 238. A base set of classification and/or categorization may be established from identified elements visible within the pool of secondary video content processed for later matching. It is that base set of classification and/or categorization of elements that is used for matching with elements visible within the primary video content. The primary video content may include additional visible elements not included in the identified elements visible within the pool of secondary video content. Thus, for the primary video content analysis, the semantic analysis module 224 may limit the identification of objects to those included and/or used to compile the base set of classification and/or categorization.

The semantic analysis results storage module 226 may be configured to save the results of the semantic analysis in memory. In particular, the results of the semantic analysis of each video in the pool of secondary video content, considered for matching to segments of primary video content, may be stored in a secondary video semantic database (e.g., 320 in FIG. 3). In this way, information about the identified elements visible in the secondary video content may be stored in memory for more than a brief period. The storage of the results from the semantic analysis of each video in the pool of secondary video content need not be specific to one target consumer (e.g., 5), but rather may be used for all consumers for which the secondary video content is intended. In contrast, the semantic analysis results storage module 226 may store results of the semantic analysis of the segments of primary video content in short-term memory, or at least until after the video content matching module 238 is finished using the results.

The secondary modifier(s) module 228 may be configured to receive and save secondary video modifier data used to add/subtract weight to select secondary video content for consideration when matching the primary video content and secondary video content. For example, some advertisers may be willing to pay a premium to have their secondary video content be provided a higher likelihood of being matched to some or all primary video content (i.e., a positive weighting). Alternatively, some video providers may not want their secondary video content associated with particular types of primary video content and thus indicate as such in the form of a secondary video provider modifier (i.e., a negative weighting). Further still, the content distributor network (e.g., 208) may provide its own modifiers regarding select secondary video content. The secondary video modifier data may be found in metadata that is made a part of the individual secondary video content, either provided by the secondary video content provider or added by an intermediate distributor or the content distributor network provider. Such metadata may be used to target specific customer profiles, primary video content, and or other considerations. The information received by the secondary modifier(s) module 228 may be stored in a database, such a secondary video semantic database (e.g., 320 in FIG. 3).]

The supplemental video content analysis module 230 may be used optionally to further analyze additional elements of video content, such as text displaying in the video or an analysis of the audio content (e.g., displayed text recognition or speech-to-text). In this way, natural language processing may be applied to the primary and/or secondary video content in order to capture keywords from the audio elements of the video content. In addition, text in a video may contain crucial information needed to identify elements or provide further detail about identified elements. For example, a reflection pool may be identified by the semantic analysis module 224, but the supplemental video content analysis module 230 may identify a sign within the video or text added to the scene may indicate that it is the Lincoln Memorial Reflecting Pool in Washington, D.C., United States. Alternatively, a reporter standing in front of the reflection pool may say, "I'm here standing in front of the Lincoln Memorial Reflecting Pool outside our nation's capital . . . ," which after a speech-to-text translation provides similar information. The additional elements determined by the supplemental video content analysis module 230 may be further considered when matching the primary video content and secondary video content. The results from the supplemental video content analysis module 230 may be stored in memory.

The user input receiving/storage module 232 may be configured to receive and store preference information from a target consumer (e.g., 5). For example, the target consumer by provide profile information that includes interests, disinterests, hobbies, and/or affiliations, as well as occupational, biographical, and/or demographical information. Similarly, the preference information may identify content that the target consumer likes particular genres, geographic locations/climates, types of apparel, vacation destinations, cars, food, brands of merchandise, etc. and indicate as a user preference that such parameters be given more weight when determining whether secondary video content matches a primary video content being viewed. Alternatively, the user input may indicate negative preferences, which identifies content a target consumer wants to avoid or just plain dislikes.

Figure 10A:
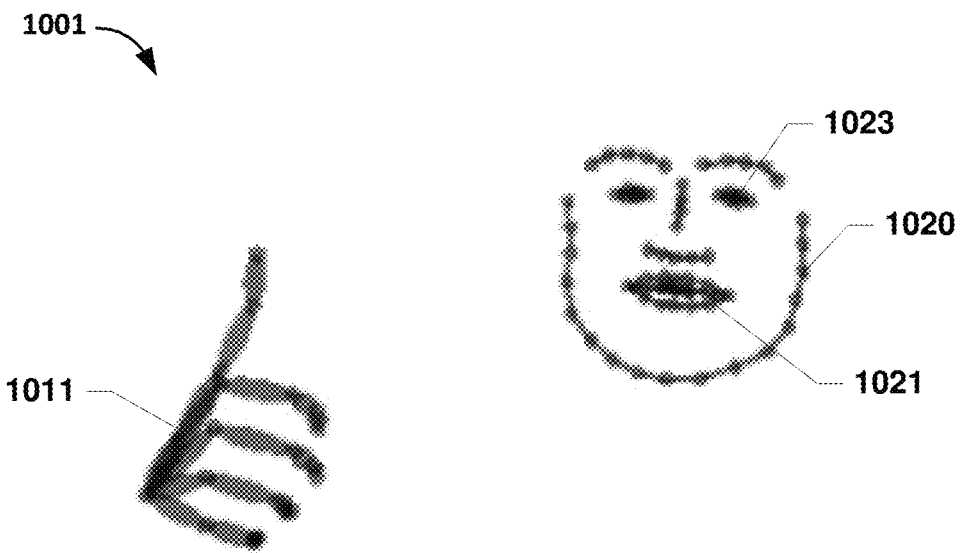
FIGS. 10A and 10B are schematic diagrams of direct feedback from a target consumer captured by one or more sensors on a set-top box suitable for use with the various embodiments.
Figure 10B:
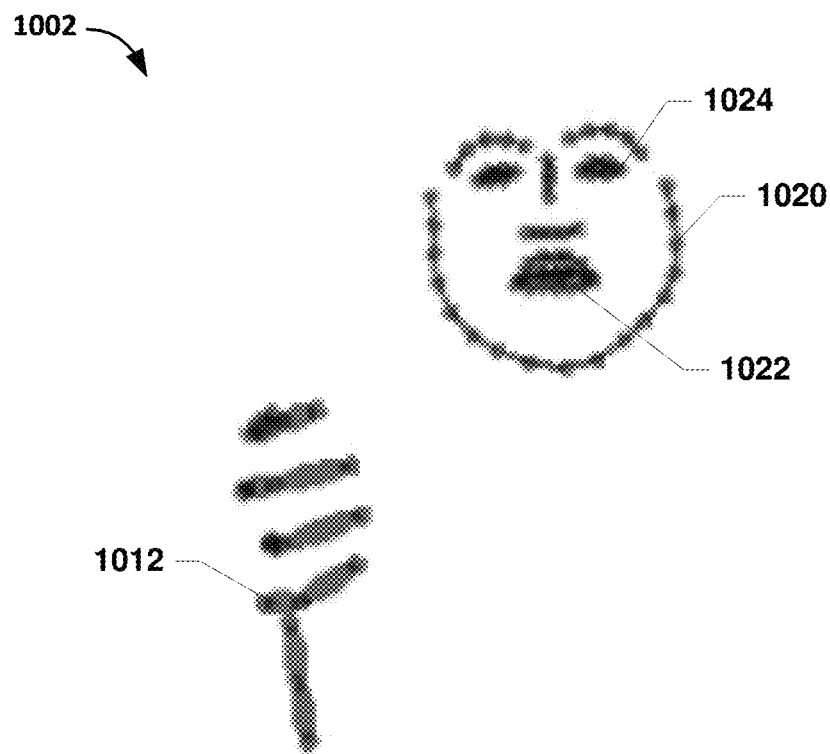

Optionally, the user input receiving/storage module 232 may receive direct input from the target consumer regarding a specific secondary video content, either while it is being presented or immediately thereafter. The user input receiving/storage module 232 by include or work in conjunction with external resources 212 for receiving input from the target consumer. Such external resources 212 (i.e., input devices) may include a manual data entry device such as a keyboard, touch-screen, game controller, TV controller, or similar device. Alternatively, such external resources 212 may include one or more optical sensors (e.g., camera 110) that are configured, in conjunction with the processor 206 to identify signs of approval or disapproval from the target consumer. The target user may be smiling, laughing, or giving a thumbs-up sign, as an indication of approval; or the target user may be frowning or giving a thumbs-down sign, as an indication of disapproval. FIGS. 10A and 10B illustrate how optical sensors detect characteristics of body features from a target consumer in order to allow that target consumer to more easily provide user input to the computing system (e.g., 200). Various embodiments may scan for changes in facial expressions, poses, and/or other body language, including a disapproving nod, laughter, or hand signals (e.g., thumbs up/down). Similarly, speech recognition modules that use a microphone may receive voice input from a user. Any received user input from the target consumer may be used considered by the video content matching module 238 when performing matching. Thus, if a target customer provides input that he/she dislikes a particular secondary video content, that particular secondary video content may not be considered or at least be less likely to be considered during the matching process. Similarly, if the target customer repeatedly provides an indication of dislike to the same secondary video content, such an indication may block the particular secondary video content from ever being used for that target customer. In contrast, if the target customer provides input that he/she likes a particular secondary video content, that particular secondary video content may be more likely to be selected as a match.

The metadata considerations receiving/storage module 234 may be configured to receive and store metadata associated with particular video content. Metadata refers to a set of data that describes and gives information about a particular video content. Various embodiments may consider elements of metadata that identify the video content with a category of media content or even identify elements and/or characteristics thereof. In particular, the metadata may identify a genre, key elements in the video content, associations between key elements, and additional information that may be considered by the video content matching module 238 for matching video content. The metadata associated with a movie, series, or show may include an overall description of the movie, including various content elements that are significant therein. Thus, the metadata considerations receiving/storage module 234 may receive and store this type of information, which may be used by the video content matching module 238 when matching secondary video content thereto. For example, a romantic comedy that takes place in a tropical setting that includes sailboats, beaches, and dining may be described in the metadata. Thus, if the semantic analysis module 224 identifies a sailboat in a scene that occurs just before a commercial break, this piece of information combined with the similar metadata information may weigh heavily when matching secondary video content. However, sometimes primary video content, like movies, series, shows, or other videos have scenes, taking place just before a commercial break, that contain elements not reflected by the general overall description included in the metadata. For example, consider the same romantic comedy described above, however just before a first commercial break the protagonist is meeting friends in a bowling alley. The semantic analysis module 224 may identify elements from the bowling alley, but no reference to a bowling alley may be included in the metadata, which may mean the metadata information is not given much weight (i.e., value) when matching secondary video content.

The video content matching module 238 may be configured to match at least a segment of a primary (i.e., first) video content with a particular secondary video content. The video content matching module 238 may compare the most recent results from the semantic analysis module 224, related to the segment of the primary (i.e., active) video content stored by the semantic analysis results storage module 226, to those results from previous semantic analysis of a pool of secondary video content, such as those stored in a secondary video semantic database (e.g., 320 in FIG. 3). In addition, the video content matching module 238 may consider additional factors to arrive at a match, such as considering one or more secondary modifier(s), supplemental analysis, user inputs, metadata, and/or other marketing elements. For example, a scene in a live television special may include identifiable elements or categories of elements, such as a person, truck, shoes, and a forest. In addition, a first advertisement (i.e., a first secondary video content) may include elements such as a car/truck and a forest, while a second advertisement (i.e., a second secondary video content) may include meat, a grill, and a soda. Thus, the first advertisement may be assigned a higher weighting (i.e., a higher rank, which represents better content consistency) than the second advertisement, which means the first advertisement is considered to have better content consistency (i.e., a better match).

The video content matching module 238 may develop a matching score for individual videos within the pool of secondary video content in order to determine which of those videos is the best match to the segment of primary video content being considered. The matching score may take into account how close various elements, characteristics, and/or categories of the compared videos are to the analogous elements, characteristics, and/or categories of the segment of the primary video content determined from the semantic analysis. In addition, the matching score may be adjusted and/or refined by taking into consideration a user profile/preferences of the target customer, and/or advertiser's guidelines or preferences. In this way, the one secondary video content with the highest matching score will be selected for presentation to the target customer immediately after the analyzed segment of the active video content.

In one scenario, the semantic analysis of the segment of the primary video content may have identified a tiger (i.e., an active video first visible element visible within the segment), which may match, for example, a dozen (i.e., twelve) videos of secondary video content from the pool of secondary video content. Thus, the initial matching dozen videos may be given a highest initial matching score. Thereafter, the video content matching module 238 may consider another identified visible element (i.e., a second visible element) from the primary video content, such as a man interacting with the tiger (e.g., a lion trainer working with a tiger). Considering this other identified visible element (i.e., the man interacting with the tiger) only one of the twelve videos of secondary video content matches, elevating that one matching video to have the highest secondary matching score. In this way, the video content matching module 238 would select and identify that one matching video to the analyzed segment of the primary video content.

Another example in a second scenario, the semantic analysis of the segment of the primary video content may have identified an airplane (i.e., an active video first visible element visible within the segment), which may match, for example, thirty videos of secondary video content from the pool of secondary video content. Thus, the initial matching thirty videos may be given a highest initial matching score. Thereafter, no additional identified visible elements (i.e., a second visible elements) from the primary video content may further narrow the field. In accordance with various embodiments, the video content matching module 238 may consider one or more secondary modifier(s) stored by the secondary modifier(s) module 228, supplemental analysis from the supplemental video content analysis module 230, user inputs from the user input receiving/storage module 232, metadata from the metadata consideration(s) receiving/storage module 234, and other marketing elements (e.g., demographics). Considering one or more of the secondary modifier(s), supplemental analysis, user inputs, metadata, and/or other marketing elements may only one of the thirty videos of secondary video content matches, elevating that one matching video to have the highest secondary matching score. In this way, the video content matching module 238 may select and identify one matching video to the analyzed segment of the primary video content.

The video content distributor module 240 may be configured to control the output of video content to the target consumer view the viewing device (e.g., 50). The video content distributor module 240 may control the presentation of the primary video content, including interruptions thereof for the presentation of secondary video content and the resumption thereafter of the primary video content. Often, the video content distributor module 240 and/or functions thereof will be handled by the content distributor network 208. In this way, the content distributor network 208 and/or the video content distributor module 240 may handle the encoding and streaming of the video content, when to pause streaming, and when to insert secondary video content, followed by the resumption of the active video content.

FIG. 3B illustrates a system block diagram of an IP network 300 suitable for use with the various embodiments. With reference to FIGS. 1-3B, the IP network 300 may include the content distributor networks 208, with remote computing devices (i.e., 210), such as one or more origin server 312, manifest manipulator server 314, alternate content server 316, programmer server 322, and/or guide vendor server 324. The content distributor network 208 may be configured to deliver streaming video content to the target consumer 5 via one or more of the computing devices 100, 101 and/or viewing device 50. The programmer servers 322, guide vendor servers 324, content distributor networks 208, and computing devices 50, 100, 101 may be connected together via one or more wired and/or wireless connections, such as connections to wired and/or wireless networks (e.g., connections to the Internet), and via those connections may exchange data with one another. In various embodiments, the content distributor network 208 may include various interconnected computing devices, such as the origin server 312, manifest manipulator server 314, and alternate content server 316. Via their connections (wired and/or wireless) with one another, the origin server 312, the manifest manipulator server 314, and the alternate content server 316 may exchange data with one another. In various embodiments, the content distributor network 208 may be operated by a content distributor (e.g., Charter®, Comcast®, DirecTV®, Sling® TV etc.) and may provide television services via IP streaming (e.g., ABR streaming, such as Apple HLS, DASH, etc., or any other type IP streaming) to consumers, such as consumer 5, via one or more of his or her consumer computing devices 50, 100, 101. As an example, computing device 100 may be a streaming media player (e.g., a ROKU®) or DVR connected to the viewing device 50 which may be a television. Computing device 100 may be optional as the viewing device 50 may itself connect to the content distributor network 208. For example, viewing device 50 may be a smart television. As another example, alternative computing device 101 may be a laptop computer, which may be connected with a wired (e.g., Ethernet) or wireless (e.g., Wi-Fi or Bluetooth®) to the content distributor network 208.

In various embodiments, the programmer server 322 may be a server of a programmer (e.g., Turner Broadcasting®, ESPN®, Disney®, Viacom®, etc.) that provides content for viewing by consumers, such as consumer 5, via the content distributor network 208. For example, the programmer server 322 may provide programmer content (i.e., video content) to the origin server 312. An encoder and packager at the programmer server 322 or origin server 312 may format the programmer content and the origin server 312 may store the programmer content (i.e., content) for IP streaming. While the origin server 312 is illustrated in FIG. 3B as part of the content distributor network 208, the origin server 312 may be a server of a separate content delivery network (CDN) service, such as Akamai®, Amazon®, Netflix®, Hulu®, Vudu®, HBOGo®, etc., to which the content distributor network 208 operator or programmer offloads content storage and delivery. The programmer server 322 may also be configured to determine alternate content for the content in a programming schedule and generate a programmer alternate content mapping table for the program schedule indicating the determined programmer alternate content. The programmer server 322 may send the program schedule and the programmer alternate content mapping table to the guide vendor server 324.

The guide vendor server 324 may be configured to receive content schedules and programmer alternate content mapping tables from various programmers and generate a program guide, indicating programmer alternate content availability, or content recommendations. The guide vendor server 324 may be a server operated by a guide vendor (e.g., Gracenote®, Rovi®, etc.). The guide vendor server 324 may send the program guide indicating programmer alternate content availability or the content recommendations to the content distributor network 208, such as to the manifest manipulator server 314. In various embodiments, the content distributor network 208, such as the manifest manipulator server 314, may provide the program guide indicating programmer alternate content availability or the content recommendations to the consumer computing devices 50, 100, 101. Alternatively, the program guide indicating programmer alternate content availability or the content recommendations may be provided from the guide vendor server 324 to the consumer computing devices 50, 100, 101.

The manifest manipulator server 314 may be configured to generate manifest files, such as a .mpd type files for DASH, .m3u8 type files for Apple HLS, etc., that describe the programmer content provided by the programmer server 322 and stored at the origin server 312. The manifest files may be stored at the origin server 312 and may defined the segments of content provided by a programmer server 322 as well as segments for advertisements to be displayed according to an ad plan for a given content or channel Manifest files may be pre-generated by the manifest manipulator server 314 based on the program guide from the guide vendor server 324. In various embodiments, the manifest manipulator server 314 may be configured to modify the pre-generated manifest files to generate manifest files for programmer alternate content or the content recommendations. The manifest manipulator server 314 may provide manifest files to requesting ones of the consumer computing devices 50, 100, 101. The consumer computing devices 50, 100, 101 may use the manifest files or the content recommendations to retrieve and play content, including programmer alternate content or the content recommendations, to the consumer 5. For example, based on a content recommendation, the computing device 50, 100, 101 may stream segments of an on-demand video from the origin server 312.

In various embodiments, the content distributor network 208 may maintain information about what content is streamed to each of its consumers, including related consumer feedback about that content. The consumer computing devices 50, 100, 101 may be configured to indicate consumer selections of programmer alternate content or a content recommendation to the content distributor network 208, such as to the alternate content server 316. The alternate content server 316 may store binding data relating a consumer identifier (ID) associated with an account of the consumer 5, such as the consumer's computing device identifier (e.g., MAC ID, etc.), subscribed identifier, etc., consumer feedback regarding content (e.g., a rating or like/dislike indication for a program by the consumer), and the consumer selection of the programmer alternate content. In this manner, a database of consumer feedback and the target consumer's 5 preferred programmer alternate content may be established at the alternate content server 316. Such binding data may be referenced to select programmer alternate content and/or secondary video content with which to replace unappealing (or disliked) content for the consumer 5.

In accordance with various embodiments, both primary and/or secondary video content may be delivered to a target consumer (e.g., 5) through virtually any viewing device configured to receive content from a content distributor network 208. Whether using a residential set-top box or similar intermediate tuning device, or running an application on a smart phone, smart TV, or other computing device, the content distributor network can deliver primary and/or secondary video content to the target consumer.

Figure 4A:
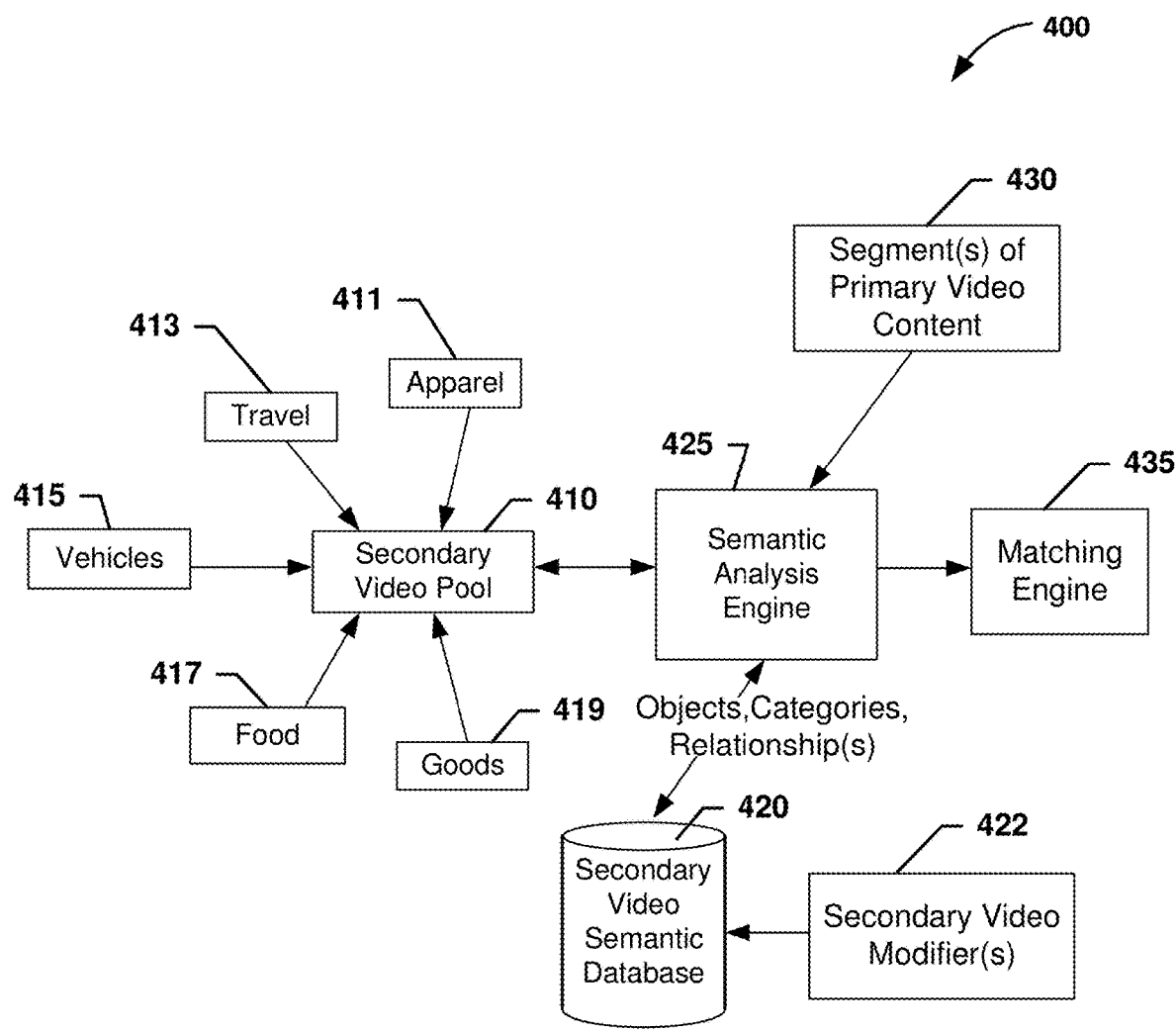
FIG. 4A is a diagram illustrating an example of a software architecture for implementing the delivery of secondary video content in accordance with various embodiments.

FIG. 4A illustrates an example of a software architecture 400 including a semantic analysis engine 425 configured to identify elements visible within video content. With reference to FIGS. 1A-4A, the computing system (e.g., 200) may implement the software architecture 400 for delivering secondary video content. In various embodiments, layers in software architecture 400 may form logical connections with corresponding layers in software of the computing system. The software architecture 400 may be distributed among one or more processors (e.g., 206). The software architecture 400 may include a semantic analysis engine 425 that is used to analyze video from one or more segment(s) of primary video content 430, as well as from secondary video content from a secondary video pool 410. The results from the semantic analysis engine 425 may be stored in a secondary video semantic database 420 or output to a matching engine 435. While illustrated with respect to one semantic analysis engine 425, the software architecture 400 may include multiple protocol stacks, each corresponding to one or more semantic analysis engines and each of which may be associated with a different computing device (e.g., two protocol stacks associated with two computing devices, respectively).

The semantic analysis engine 425 may be configured to identify key elements visible within video content, which may perform the functions of and/or may be synonymous with the semantic analysis module (e.g., 224) described above. These key video contents may be trained from the previous semantic analysis of the pool of secondary video content. In addition to analyzing segments of primary video content 430 while the primary video content is being viewed by a target consumer, the semantic analysis engine 425 may analyze all or part of each secondary video content maintained in a secondary video pool 410. The results from the analysis of the primary video content may be output to the matching engine 435. In contrast, the results from the analysis of the pool of secondary video content (i.e., from the secondary video pool 410) may be stored in the secondary video semantic database 420.

The secondary video pool 410 may include all the secondary video content being considered by the semantic analysis engine 425. Alternatively, the secondary video pool 410 may include a larger collection of video content, many or some of which are not considered by the semantic analysis engine 425 for a particular segment of primary video content. Thus, the secondary video pool 410 may include one or more subsets of pools that get considered under select circumstances. Unlike the primary video content, segments of which get analyzed just before the matching engine attempts to make a match, each secondary video content in the secondary video pool 410 may be analyzed ahead of time. In this way, for a particular primary video content, such as one being viewed by a target consumer (e.g., 5), a select subset of videos from the secondary video pool may be considered for matching by the semantic analysis engine 425. The individual videos that make up the secondary video pool 410 need not be directly related to any particular primary video content. In fact, there may be no direct relationship between the primary video content and the videos in the secondary video pool.

A content distributor network (e.g., 208) or the like may receive candidate secondary video content from various sources, such as content distributors (e.g., content distributor network 208) and/or directly from advertisers, sponsors, and others. The videos received by the content distributor network may be saved/stored in the secondary video pool 410, which may include many different types of secondary video content, distinguished mainly by the key elements therein. For example, the secondary video pool 410 may comprise videos that emphasize apparel 411, travel 413, vehicles 415, food 417, goods 419, and many more. In addition, each type of secondary video content may include one or more levels of subcategories that further distinguish the video content associated therewith. For example, subcategories may include, for apparel 411: children's, men's, women's, sports, formal, casual, etc.; for travel 413: adventure, touring, cruises, beach, lake, mountain, etc.; for vehicles 415: cars, trucks, SUV's, vans, utility, sports, etc.; for food 417: cooking, shopping, dining, fast-food, etc.; and for goods 419: electronics, beauty, appliances, convenience, impulse, luxury, etc. Further, the secondary video content in the secondary video pool may include information about product/service brands, metadata associated with the product/service brands, and metadata regarding the content of each secondary video content.

With regard to the analyzed secondary video content, the results from the semantic analysis engine 425, may include various types of information associated with each video segment from the secondary video pool 410. For each video, there may be an entry listing the key objects identified therein. Also, each video and/or each identified object may have an associated type or classification. In addition, each identified object may have an entry indicating a relationship to other objects in the same video. The relationship may simply indicate two objects are related or may indicate the type of interaction between those objects. For example, if a woman and a horse are identified, the relationship may indicate the woman is riding the horse. Similarly, if boy and a pool are identified, the relationship may indicate the boy is in the pool, for example, swimming or playing.

The secondary video semantic database 420 may optionally further include one or more secondary video modifier(s) 422, which indicate a weighting that may be given to one or more of the videos in the secondary video pool 410. The secondary video modifier(s) 422 may describe elements, themes, brands, and other aspects of the secondary video content.

The matching engine 435 may perform the functions of and/or may be similar to the video content matching module (e.g., 238) described above. Thus, the matching engine 435 may receive the results of the semantic analysis by the semantic analysis engine 425 on a segment of primary video content. The matching engine 435 may compare the received results to results in the secondary video semantic database 420 to find a matching video from the secondary video pool 410. Additionally, the matching engine 435 may consider one or more secondary modifier(s), supplemental analysis, user inputs, metadata, and/or other marketing elements to find the matching video.

While the software architecture 400 may provide functions to transmit data through physical media, the software architecture 400 may further include at least one host layer to provide data transfer services to various applications in the computing device. In some embodiments, application-specific functions provided by the at least one host layer may provide an interface between the software architecture and a general-purpose processor. Various embodiments may use a combination of software and hardware, such as a compute unified device architecture (CUDA) enabled graphic processor(s) or Open CL enabled processors for video processing, resizing, filtering, and searching in video content, including cropping, rotating, and/or scaling elements therein.

In other embodiments, the software architecture 400 may include one or more higher logical layer (e.g., transport, session, presentation, application, etc.) that provide host layer functions. For example, in some embodiments, the software architecture 400 may include a network layer (e.g., IP layer) in which a logical connection terminates at a packet data network (PDN) gateway (PGW). In some embodiments, the software architecture 400 may include an application layer in which a logical connection terminates at another device (e.g., end user device, server, etc.). In some embodiments, the software architecture 400 may further include a hardware interface between a physical layer and communication hardware (e.g., one or more radio frequency (RF) transceivers).

Figure 4B:
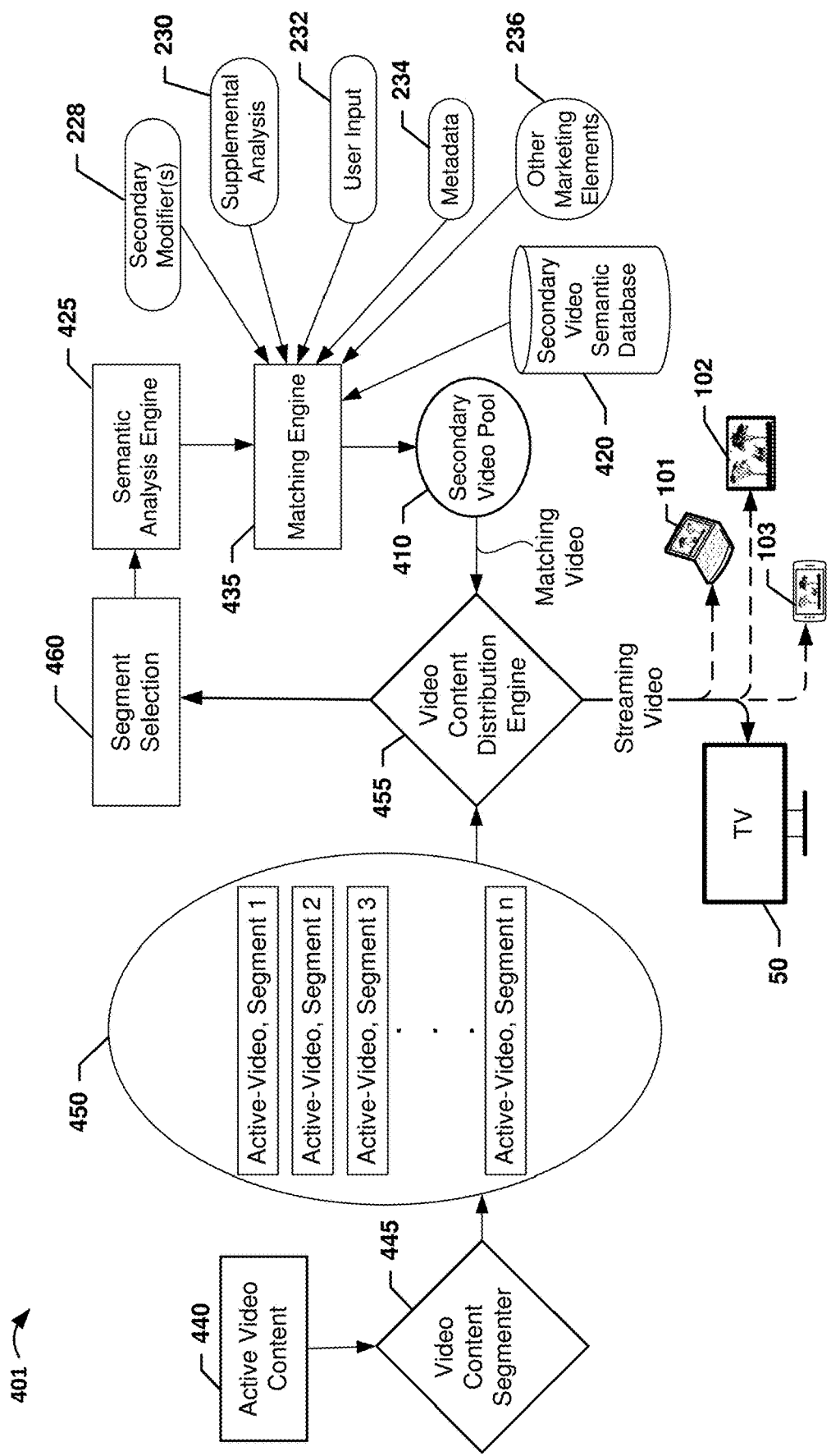
FIG. 4B is a diagram illustrating an example of another software architecture for implementing the delivery of secondary video content in accordance with various embodiments.

FIG. 4B illustrates an example of a software architecture 401 including a video content distribution engine configured to control the output of video content to the target consumer viewing content on one or more viewing devices 50, 101, 102, 103. With reference to FIGS. 1A-4B, the computing system (e.g., 200) may implement the software architecture 401 for delivering primary and secondary video content. In various embodiments, layers in software architecture 401 may form logical connections with corresponding layers in software of the computing system. The software architecture 401 may be distributed among one or more processors (e.g., 206). While illustrated with respect to one semantic analysis engine 425, the software architecture 401 may include multiple protocol stacks, each corresponding to one or more semantic analysis engine(s) 425 and each of which may be associated with a different computing device 100 (e.g., two protocol stacks associated with two computing devices, respectively).

In accordance with various embodiments, active video content 440 may be received at a video content segmenter 445. The active video content 440 may be received from the content distributor network (e.g., 208), the remote computing device(s) (e.g., 210), and/or the external resources (e.g., 212). Depending upon the network elements available and target consumer's viewing device(s) (e.g., 50, 101, 102, 103), the target consumer's profiles, resolution, bit-rate, etc. may vary for optimization.

The video content segmenter 445 may perform the functions of and/or may be synonymous with the video content segmenting module (e.g., FIG. 3A, 220) described above. In particular, video content segmenter 445 may divide the active video content 440 into smaller segments 450 (e.g., Active video, Segment 1; Active video, Segment 2; Active video, Segment 3; . . . Active video, Segment n), which may be stored in a video content cache (e.g., 218).

The video content distribution engine 455 may be configured to control the output of video content to the target consumer via the viewing device 50. Also, the video content distribution engine 455 may perform the functions of and/or may be synonymous with the video content distribution module (e.g., FIG. 3A, 240) described above. In this way, the video content distribution engine 455 may decide whether to stream segments of the active video content or whether to interrupt the active video content and stream a select video from the secondary video pool 410.

Using functions of the segment selection module (e.g., FIG. 3A, 222), the video content distribution engine 455 may recognize when a segment of the active video content is the last segment before an interruption in the active video content or the end of the active video content. The recognized last segment may be selected, as a segment selection 460, for analysis by the semantic analysis engine 425. The semantic analysis engine 425 may perform the functions of and/or may be synonymous with the semantic analysis module (e.g., FIG. 3A, 224) described above. After performing the semantic analysis on the segment selection 460, the semantic analysis engine 425 may convey the results to the matching engine 435. The matching engine 435 may compare the received results to matching scores from the secondary video pool 410, which matching scores may be maintained in the secondary video semantic database 420 to find a matching video from the secondary video pool 410. Additionally, the matching engine 435 may consider input from one or more of the secondary modifier(s) module (i.e., secondary modifier(s) 228), the supplemental video content analysis/storage module (i.e., supplemental analysis 230), the user input receiving/storage module (i.e., user input 232), the metadata consideration(s) receiving/storage module (i.e., metadata 234), and/or the other marketing elements module (i.e., other marketing elements 236) to find the matching video. Once determined, the matching video may be supplied to the video content distribution engine 455 for distribution as streaming video to the target consumer at one or more viewing devices (e.g., 50, 101, 102, 103).

In this way, the video content distribution engine 455 may seamlessly present secondary video content to the target customer 5 (i.e., the viewer) as streaming video on the viewing device 50, during a brief interruption of the active primary video content, with the active primary video content resuming after the secondary video content is finished. The matching video used as the secondary video content will seem contextually relevant to the target consumer due to the similarity of key visual elements in both video content.

In other embodiments, the software architecture 401 may include one or more higher logical layer (e.g., transport, session, presentation, application, etc.) that provide host layer functions. For example, in some embodiments, the software architecture 401 may include a network layer (e.g., IP layer) in which a logical connection terminates at a packet data network (PDN) gateway (PGW). In some embodiments, the software architecture 401 may include an application layer in which a logical connection terminates at another device (e.g., end user device, server, etc.). In some embodiments, the software architecture 401 may further include a hardware interface between a physical layer and communication hardware (e.g., one or more radio frequency (RF) transceivers).

FIGS. 5A-5I illustrates operations of a methods 500, 501, 503, 505, 507, 509, 511, 513, and 515 that may be implemented for setting up and operating a system for delivering secondary video content. The operations of the methods 500, 501, 503, 505, 507, 509, 511, 513, and 515 presented below are intended to be illustrative. In some embodiments, the methods 500, 501, 503, 505, 507, 509, 511, 513, and 515 may be accomplished with one or more additional operations not described, and/or without one or more of the operations discussed. Additionally, the order in which the operations of methods 500, 501, 503, 505, 507, 509, 511, 513, and 515 are illustrated in FIGS. 5A, 5B, 5C, 5D, 5E, 5F, 5G, 5H, and/or 5I and described below is not intended to be limiting.

In some embodiments, methods 500, 501, 503, 505, 507, 509, 511, 513, and 515 may be implemented in one or more processors (e.g., 206 and/or 601, 701, 801, 901 in FIGS. 6-9, respectively). The one or more processor(s) may include one or more device(s) executing some or all of the operations of the methods 500, 501, 503, 505, 507, 509, 511, 513, and 515 in response to instructions stored electronically on an electronic storage medium. The one or more processor(s) may include one or more devices configured through hardware, firmware, and/or software to be specifically designed for execution of one or more of the operations of the methods 500, 501, 503, 505, 507, 509, 511, 513, and 515. For example, with reference to FIGS. 1A-5I, the operations of the method 500 may be performed by a processor 206 of the computing device (e.g., 50 and/or 100, 101, 102, 103, 900 in FIGS. 1A-2C and 7-9, respectively) with deep learning computational capabilities.

Figure 5A:
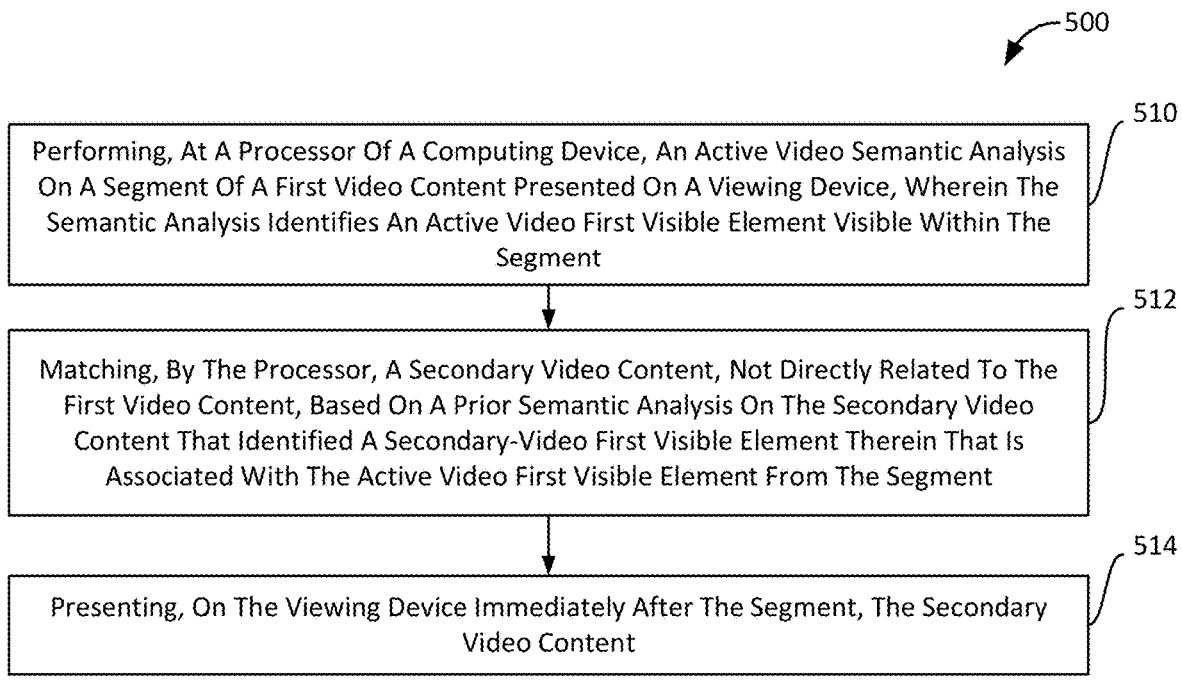
FIGS. 5A-5I are process flow diagrams illustrating embodiment methods for delivering secondary video content suitable for use with various embodiments.

FIG. 5A illustrates the method 500, in accordance with one or more embodiments. In block 510, the processor 206 of the computing device 100 may perform an active video semantic analysis on a segment of a first video content presented on a viewing device 50. The semantic analysis may identify an active video first visible element visible within the segment. The semantic analysis in block 510 may be performed by the semantic analysis module (e.g., FIG. 3A, 222) and/or the semantic analysis engine (e.g., FIGS. 4A and 4B, 425).

In various embodiments, the semantic analysis in block 510 may be performed primarily or entirely by one or more processors in the remote computing device(s) 210 (e.g., in the content distributor network 208) and may be performed separately for numerous target consumers (5) in parallel. While the semantic analysis of one particular video clip may be applied to multiple target consumers that are all viewing or will be view the same video clip, the content distributor network may be configured to handle many thousands of target consumers that may be simultaneously viewing different primary video content.

In block 512, the processor may match a secondary video content, not directly related to the first video content, based on a semantic analysis that was previously performed on the secondary video content that identified a secondary-video first visible element therein that is associated with the active video first visible element from the segment. The matching in block 512 may be performed by the video content matching module (e.g., FIG. 3A, 238) and/or the matching engine (e.g., FIGS. 4A and 4B, 435).

In various embodiments, the secondary video content matching in block 512 may be performed primarily or entirely by one or more processors in the local computing device(s) 100 (e.g., the set-top box), unlike the semantic analysis that may be more likely done remotely.

In block 514, the processor 206 may present on the viewing device 50, immediately after the segment, the secondary video content. The presentation in block 514 may be performed by the video content distribution module (e.g., FIG. 3A, 240) and/or the video content distribution engine (e.g., FIG. 4B, 455).

In some embodiments, the processor 206 may repeat the operations in blocks 510, 512, and 514 to periodically or continuously set up and operate a system for delivering secondary video content.

Figure 5B:
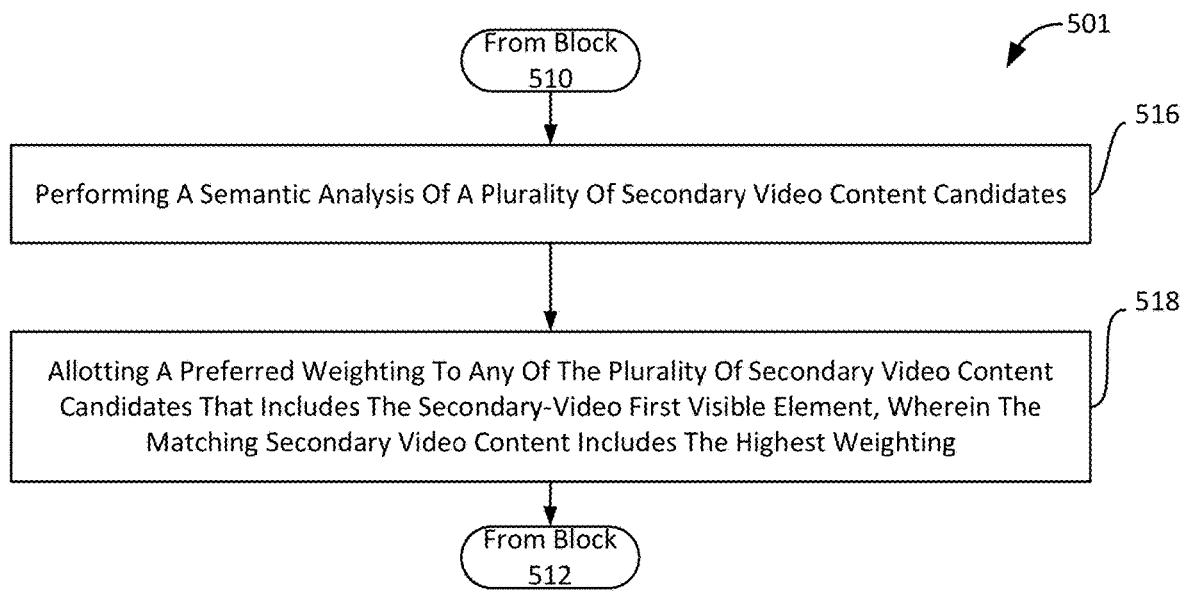

FIG. 5B illustrates the method 501, in accordance with one or more embodiments. In block 516, following the operations of block 510 the processor 206 may perform operations including performing a semantic analysis of a plurality of secondary video content candidates. The semantic analysis in block 516 may also be performed by the semantic analysis module (e.g., FIG. 3A, 222) and/or the semantic analysis engine (e.g., FIGS. 4A and 4B, 425). In block 518, the processor 206 may allot a preferred weighting to any of the plurality of secondary video content candidates that includes the secondary-video first visible element, wherein the matching secondary video content includes the highest weighting.

In various embodiments, the weighting (i.e., scoring) of the secondary video content in block 518 may be performed primarily or entirely by one or more processors in the local computing device(s) 100 (e.g., the set-top box), unlike the semantic analysis that may be more likely done remotely. Also, because numerous secondary video content may need to be considered, the weighting of many or all of the secondary video content may be performed in parallel.

Following the operations in block 518, the processor 206 may perform the operations in block 512 as described. In some embodiments, the processor may repeat the operations in blocks 510, 512, 514, 516, and 518 to periodically or continuously set up and operate a system for delivering secondary video content.

Figure 5C:
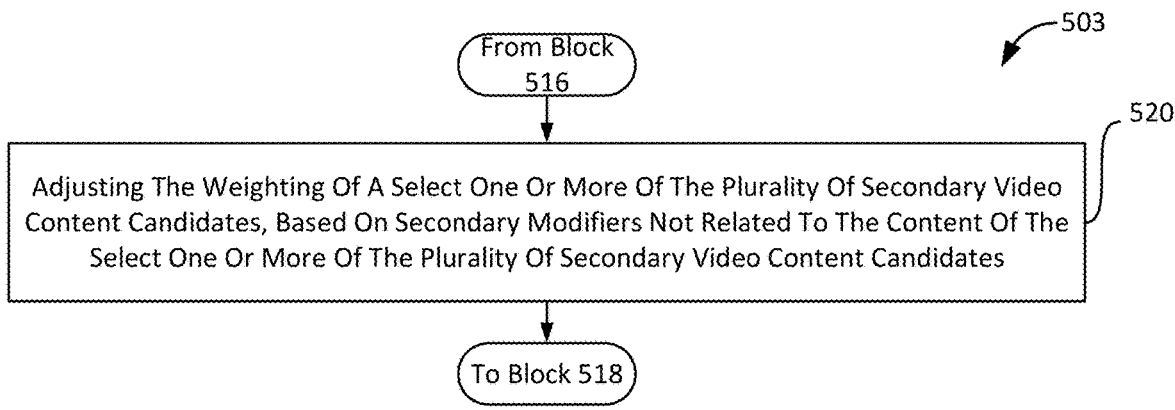

FIG. 5C illustrates the method 503, in accordance with one or more embodiments. In block 520, following the operations of block 516 the processor 206 may adjust the weighting of a select one or more of the plurality of secondary video content candidates, based on secondary modifiers not related to the content of the select one or more of the plurality of secondary video content candidates. The weighting adjustment in block 520 may take into account or be independent of the semantic analysis. Following the operations in block 520, the processor 206 may perform the operations in block 518 as described. In some embodiments, the processor may repeat the operations in blocks 510, 512, 514, 516, 518, and 520 to periodically or continuously set up and operate a system for delivering secondary video content.

Figure 5D:
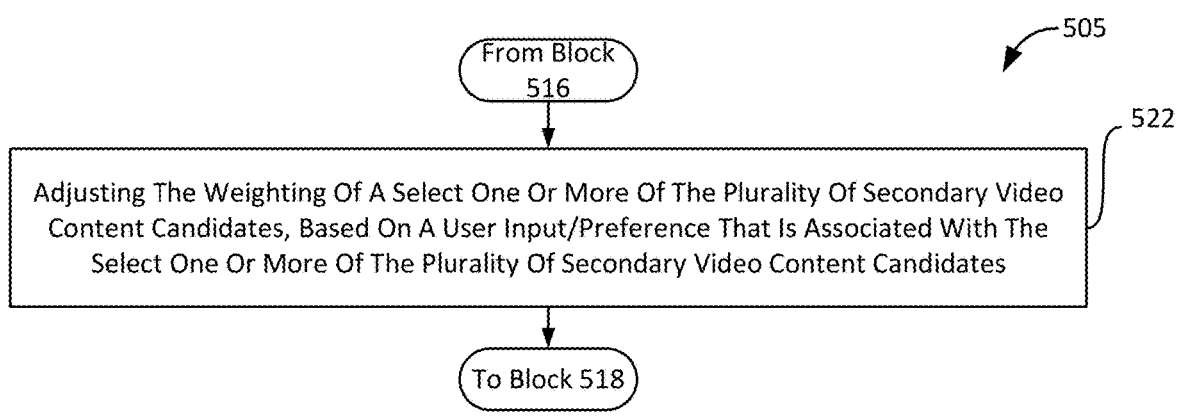

FIG. 5D illustrates the method 505, in accordance with one or more embodiments. In block 522, following the operations of block 516 the processor 206 may adjust the weighting of a select one or more of the plurality of secondary video content candidates, based on a user input/preference that is associated with the select one or more of the plurality of secondary video content candidates. The weighting adjustment in block 522 may take into account or be independent of the semantic analysis. Following the operations in block 522, the processor 206 may perform the operations in block 518 as described. In some embodiments, the processor may repeat the operations in blocks 510, 512, 514, 516, 518, and 522 to periodically or continuously set up and operate a system for delivering secondary video content.

Figure 5E:
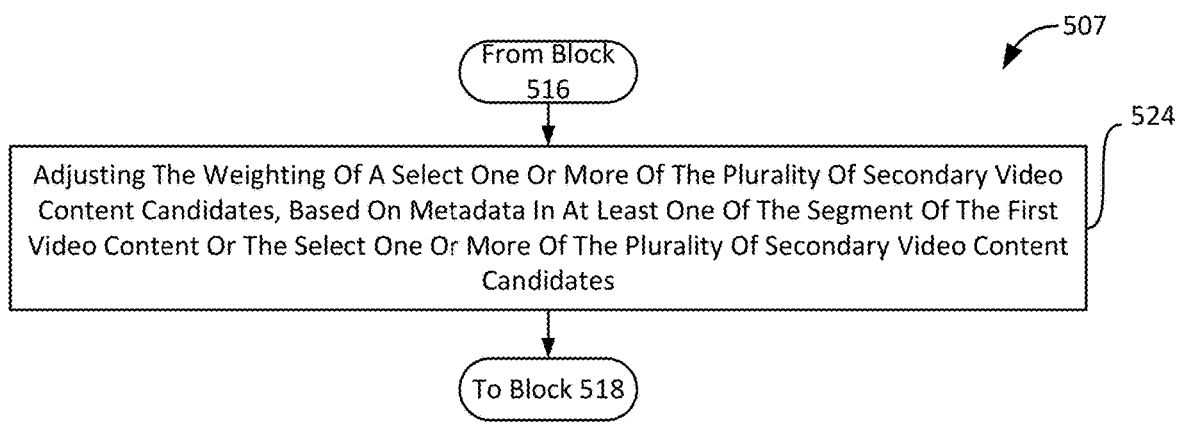

FIG. 5E illustrates the method 507, in accordance with one or more embodiments. In block 524, following the operations of block 516 the processor 206 may adjust the weighting of a select one or more of the plurality of secondary video content candidates, based on metadata in at least one of the segment of the first video content or the select one or more of the plurality of secondary video content candidates. The weighting adjustment in block 524 may take into account or be independent of the semantic analysis. Following the operations in block 524, the processor 206 may perform the operations in block 518 as described. In some embodiments, the processor 206 may repeat the operations in blocks 510, 512, 514, 516, 518, and 524 to periodically or continuously set up and operate a system for delivering secondary video content.

Figure 5F:
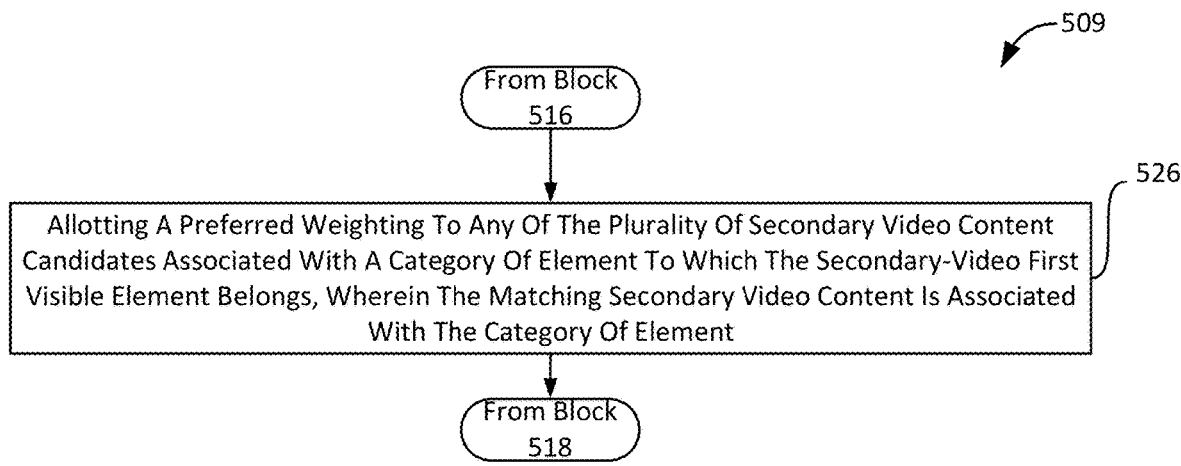

FIG. 5F illustrates the method 509, in accordance with one or more embodiments. In block 526, following the operations of block 516 the processor 206 may allot a preferred weighting to any of the plurality of secondary video content candidates associated with a category of element to which the secondary-video first visible element belongs, wherein the matching secondary video content is associated with the category of element. Following the operations in block 526, the processor 206 may perform the operations in block 518 as described. In some embodiments, the processor may repeat the operations in blocks 510, 512, 514, 516, and 526 to periodically or continuously set up and operate a system for delivering secondary video content.

Figure 5G:
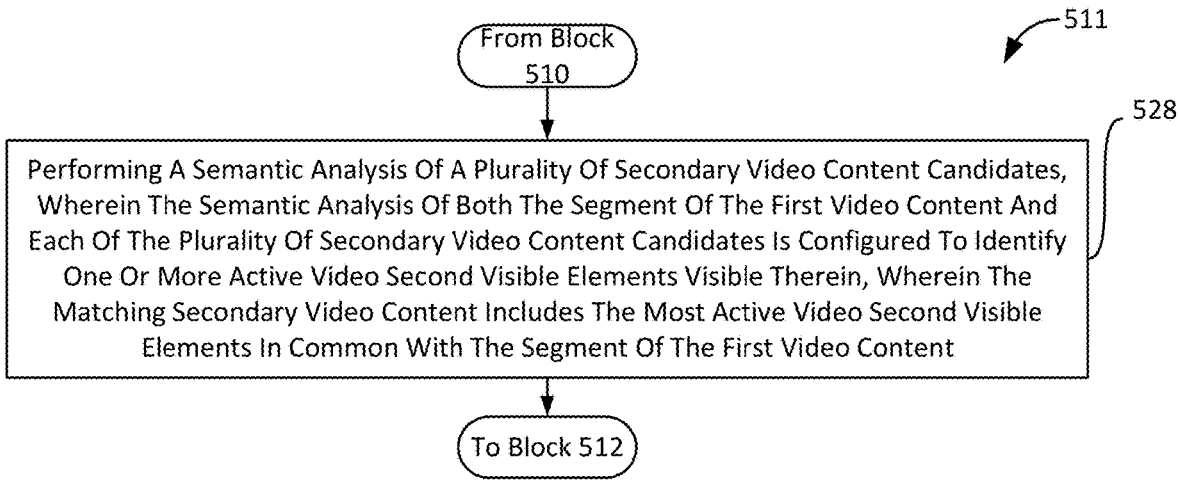

FIG. 5G illustrates the method 511, in accordance with one or more embodiments. In block 528, following the operations of block 510 the processor 206 may perform a semantic analysis of a plurality of secondary video content candidates. The semantic analysis of both the segment of the first video content (e.g., the short video clip taking place minutes before the next interruption) and each of the plurality of secondary video content candidates may be configured to identify one or more active video second visible elements that are visible therein. The semantic analysis in block 528 may also be performed by the semantic analysis module (e.g., 222 in FIG. 3A) and/or the semantic analysis engine (e.g., 425 in FIGS. 4A and 4B). The matching of the secondary video content may include the most active video second visible elements in common with the segment of the first video content. Following the operations in block 528, the processor 206 may perform the operations in block 512 as described. In some embodiments, the processor 206 may repeat the operations in blocks 510, 512, 514, and 528 to periodically or continuously set up and operate a system for delivering secondary video content.

Figure 5H:
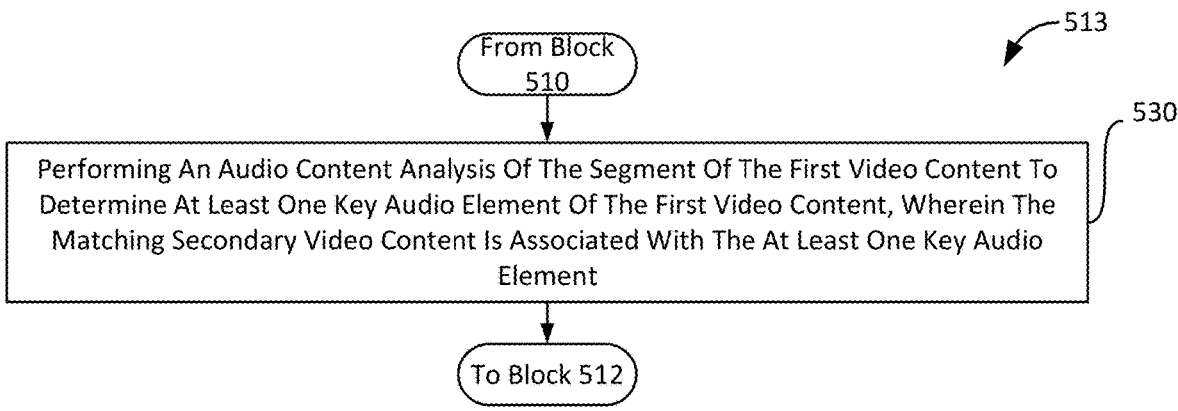

FIG. 5H illustrates the method 513, in accordance with one or more embodiments. In block 530, following the operations of block 510 the processor 206 may perform an audio content analysis of the segment of the first video content to determine at least one key audio element of the first video content, wherein the matching secondary video content is associated with the at least one key audio element. While speech recognition differs from video imaging analysis (e.g., video semantic analysis), the results of each may potentially be used to identify the most content consistent secondary video content available. The audio content analysis in block 530 may also be performed by the supplemental video content analysis/storage module (e.g., FIG. 3A, 230). Following the operations in block 530, the processor 206 may perform the operations in block 512 as described. In some embodiments, the processor 206 may repeat the operations in blocks 510, 512, 514, and 530 to periodically or continuously set up and operate a system for delivering secondary video content.

Figure 5I:
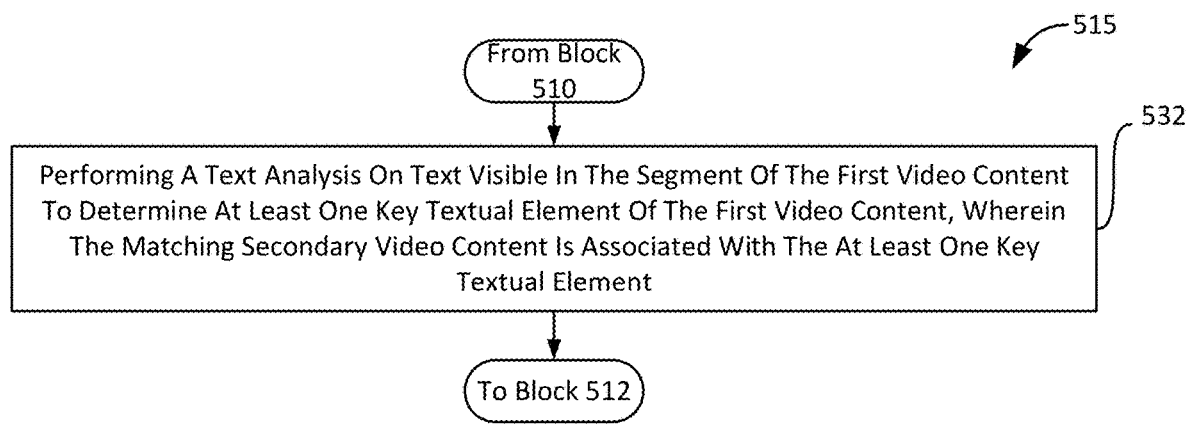

FIG. 5I illustrates the method 515, in accordance with one or more embodiments. In block 532, following the operations of block 510 the processor 206 may perform a text analysis on text visible in the segment of the first video content to determine at least one key textual element of the first video content, wherein the matching secondary video content is associated with the at least one key textual element. The text analysis in block 530 may also be performed by the supplemental video content analysis/storage module (e.g., 230). Following the operations in block 532, the processor 206 may perform the operations in block 512 as described. In some embodiments, the processor may repeat the operations in blocks 510, 512, 514, and 532 to periodically or continuously set up and operate a system for delivering secondary video content.

Figure 6:
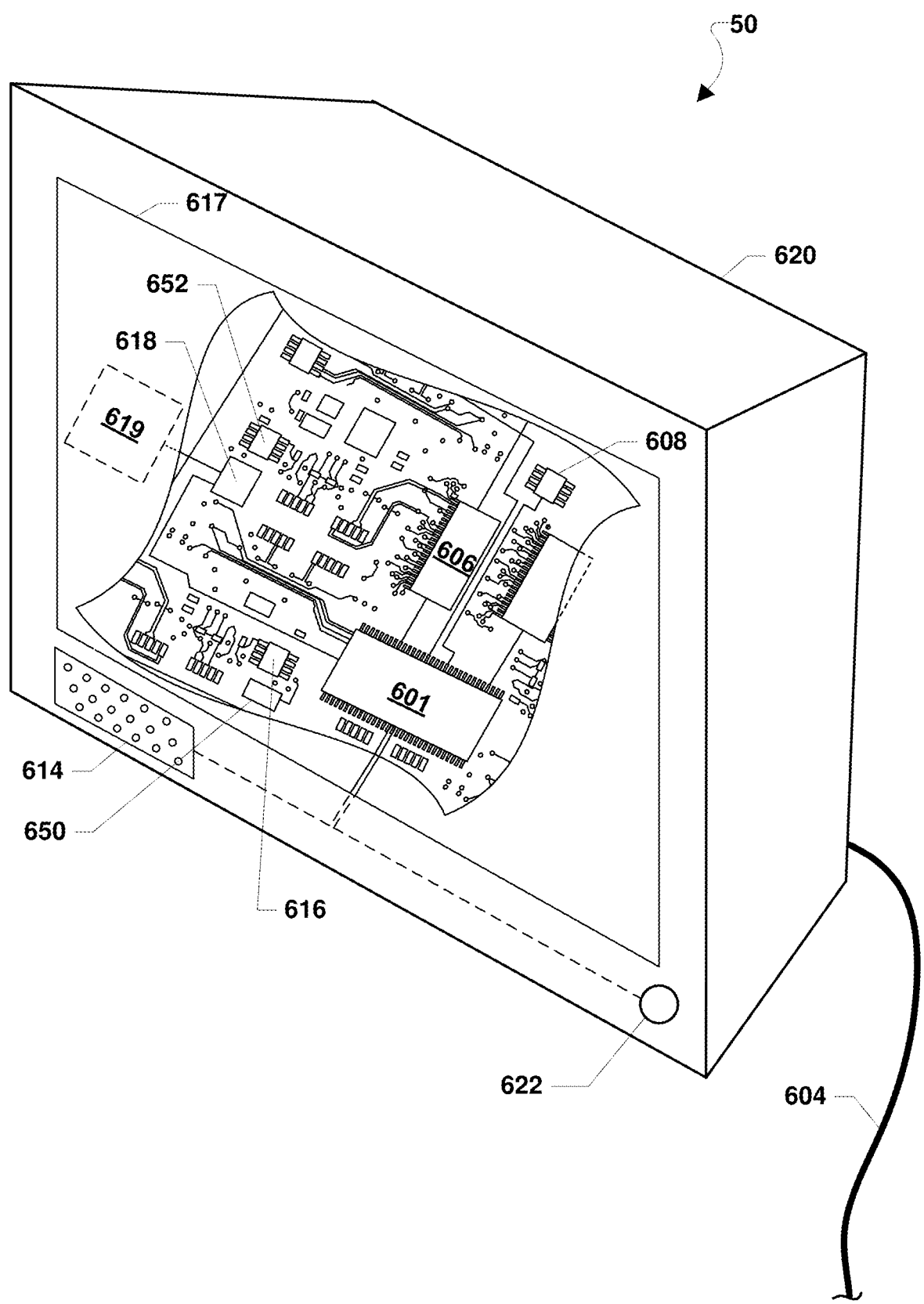
FIG. 6 is a component diagram of an example computing device suitable for use with various embodiments.

The various embodiments (including, but not limited to, embodiments discussed above with reference to FIGS. 1A-5I), may be implemented in any of a variety of computing devices, including a smart television 50, an example of which is illustrated in FIG. 6. With reference to FIGS. 1A-6, the smart television 50 may include a processor 601 and an internal memory 606. The processor 601 may be one or more multi-core integrated circuits designated for general or specific processing tasks. The internal memory 606 may be volatile or non-volatile memory and may also be secure and/or encrypted memory, or unsecure and/or unencrypted memory, or any combination thereof. In another embodiment (not shown), the smart television 50 may also be coupled to an external memory, such as an external hard drive. The smart television 50 may have one or more satellite, cable, or terrestrial tuners 608 coupled to the processor 601. The one or more tuners 608 may be used with the above-mentioned circuitry to receive and tune signals (e.g., television signals) received from a transmitter system (not shown) over a physical connection 604 (e.g., a connection to a cable network, a connection to an antenna, etc.). The tuner 608 and a connected antenna (internal to the television 50 or connected via physical connection 604 may be configured to receive IP streamed content.

The smart television 50 may have one or more radio signal transceivers 616 (e.g., Peanut®, Bluetooth®, Zigbee®, Wi-Fi, RF, cellular, etc.) and antennae 650, for sending and receiving, coupled to each other and/or to the processor 601. The transceivers 616 and antennae 650 may be used with the above-mentioned circuitry to implement various wireless transmission protocol stacks and interfaces. The smart television 50 may include one or more cellular network wireless modem chips 652, that enables communication via one or more cellular networks and that are coupled to the processor 601. The one or more cellular network wireless modem chips 652 may enable the smart television 50 to receive broadcast services from one or more cellular networks (e.g., CDMA, TDMA, GSM, PCS, 3G, 4G, LTE, or any other type of cellular network).

The smart television 50 may include a peripheral device connection interface 618 coupled to the processor 601. The peripheral device connection interface 618 may be singularly configured to accept one type of connection or may be configured to accept various types of physical and communication interfaces/connections, common or proprietary, such as a graphic card, GPU, USB, FireWire, Thunderbolt, or PCIe. The peripheral device connection interface 618 may also be coupled to a similarly configured peripheral device connection port (not shown), such as a connection port included on a conditional access module 619 in communication with the television 50.

The smart television 50 may also include speakers 614 for providing audio outputs. The smart television 50 may also include a housing 620, constructed of a plastic, metal, or a combination of materials, for containing all or some of the components discussed herein. The smart television 50 may be connected to a power source (not shown), such as a wall outlet. The smart television 50 may also include a physical button 622 for receiving consumer inputs. The smart television 50 may also include a display screen 617 coupled to the processor 601 and used for displaying visual images, such as television content, etc.

Figure 7A:
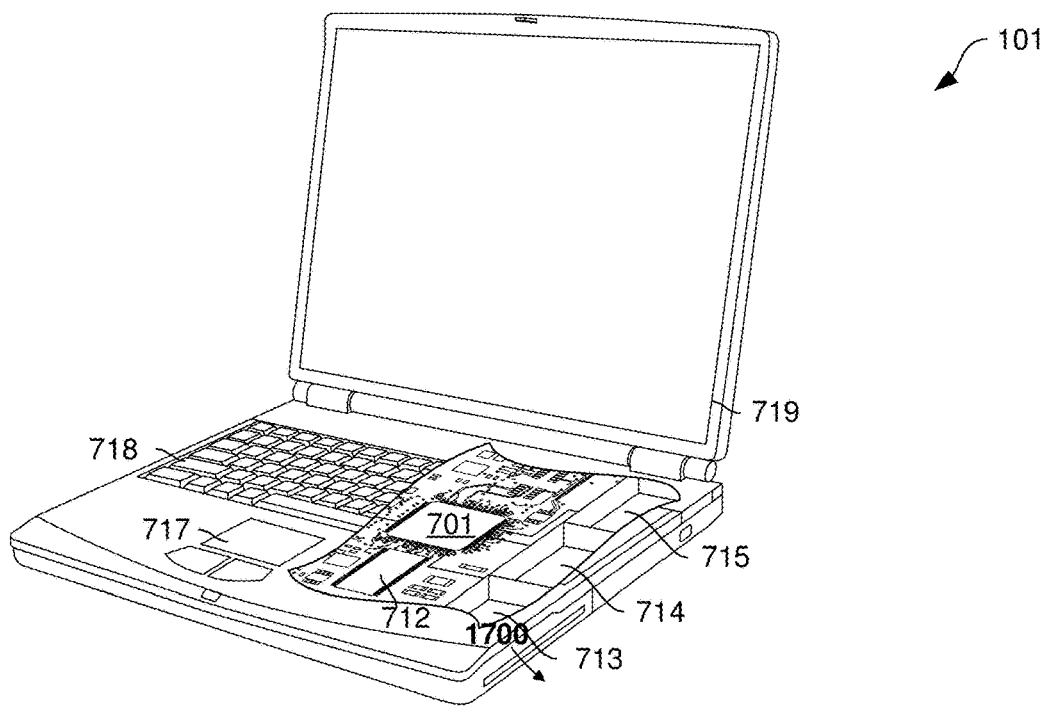
FIGS. 7A and 7B are component diagrams of examples of alternative computing devices suitable for use with various embodiments.

The various embodiments (including, but not limited to, embodiments discussed above with reference to FIGS. 1A-6) described above may also be implemented within a variety of computing devices, such as a laptop computer 101 as illustrated in FIG. 7A. With reference to FIGS. 1A-7A, many laptop computers may include a touch pad touch surface 717 that serves as the computer's pointing device, and thus may receive drag, scroll, and flick gestures similar to those implemented on mobile computing devices equipped with a touch screen display and described above. A laptop computer 101 will typically include a processor 701 coupled to volatile memory 712 and a large capacity nonvolatile memory, such as a disk drive 713 of Flash memory. The laptop computer 101 may also include a floppy disc drive 714 and a compact disc (CD) drive 715 coupled to the processor 701. The laptop computer 101 may also include a number of connector ports coupled to the processor 701 for establishing data connections or receiving external memory devices, such as a USB or FireWire® connector sockets, or other network connection circuits (e.g., interfaces) for coupling the processor 701 to a network. In a notebook configuration, the computer housing may include the touchpad 717, the keyboard 718, and the display 719 all coupled to the processor 701. Other configurations of the computing device may include a computer mouse or trackball coupled to the processor (e.g., via a USB input) as are well known, which may also be used in conjunction with the various embodiments.

Figure 7B:
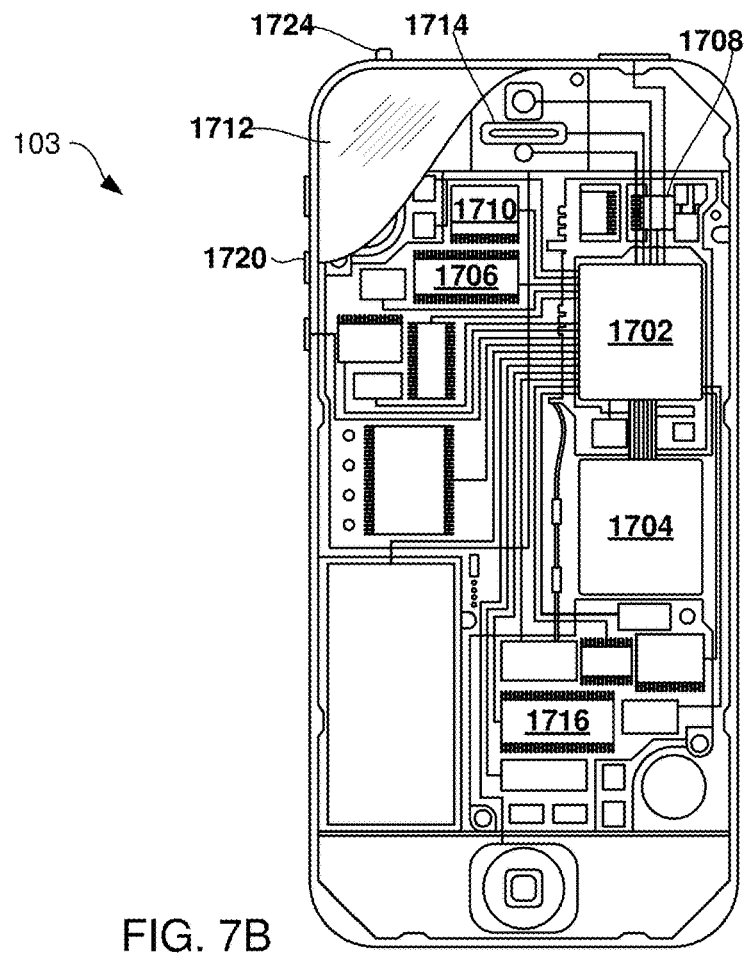

FIG. 7B shows a component block diagram of an example client device. Various embodiments may be implemented on a variety of wireless devices, an example of which is illustrated in FIG. 7B in the form of a smartphone 103. The smartphone 103 may include a first system-on-chip (SOC) 1702 (such as a SOC-CPU) coupled to a second SOC 1704 (such as a 5G capable SOC). The first and second SOCs 1702, 1704 may be coupled to internal memory 1706, 1716, a display 1712, and to a speaker 1714. Additionally, the smartphone 1700 may include an antenna 1724 for sending and receiving electromagnetic radiation that may be connected to a wireless data link or cellular telephone transceiver 1708 coupled to one or more processors in the first or second SOCs 1702, 1704. Smartphones 103 typically also include menu selection buttons or rocker switches 1720 for receiving user inputs.

A typical smartphone 103 also includes a sound encoding/decoding (CODEC) circuit 1710, which digitizes sound received from a microphone into data packets suitable for wireless transmission and decodes received sound data packets to generate analog signals that are provided to the speaker to generate sound. Also, one or more of the processors in the first and second SOCs 1702, 1704, wireless transceiver 1708 and CODEC 1710 may include a digital signal processor (DSP) circuit (not shown separately).

The processors of the smartphone 103 may be any programmable microprocessor, microcomputer or multiple processor chip or chips that can be configured by software instructions (applications) to perform a variety of functions, including the functions of the various implementations described below. In some mobile devices, multiple processors may be provided, such as one processor within a system-on-chip (SOC) dedicated to wireless communication functions and one processor within another SOC dedicated to running other applications. Typically, software applications may be stored in the memory 1706, 1716 before they are accessed and loaded into the processor. The processors may include internal memory sufficient to store the application software instructions.

Figure 8:
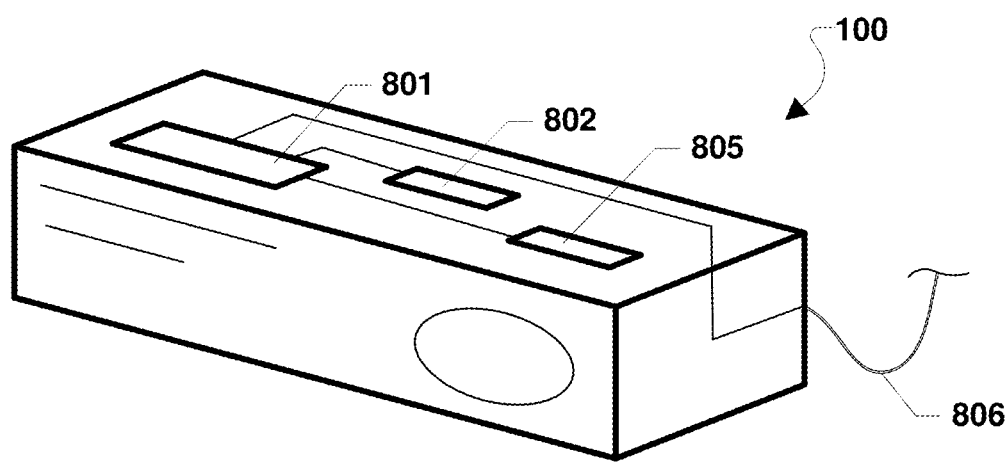
FIG. 8 is a component diagram of an example streaming media player suitable for use with the various embodiments.

The various embodiments (including, but not limited to, embodiments discussed above with reference to FIGS. 1A-7B) may also be implemented on any of a variety of computing devices, such as a set-top box, DVR, or other streaming media player, as illustrated in FIG. 8. With reference to FIGS. 1A-8, a computing device 100 may include a processor 801 coupled to volatile memory 802. The computing device 100 may also include one or more connection or port 806 coupled to the processor 801 and configured to output streaming content to a display. The computing device 100 may also include one or more network transceivers 805, such as a network access port, coupled to the processor 801 for establishing wired or wireless network interface connections with a communication network, such as a local area network coupled to other computing devices and routers/switches, the Internet, the public switched telephone network, and/or a cellular network (e.g., CDMA, TDMA, GSM, PCS, 3G, 4G, LTE, or any other type of cellular network). The computing device 100 may receive media content via a network transceiver 805 and output the media content to a display via the connection or port 806.

Figure 9:
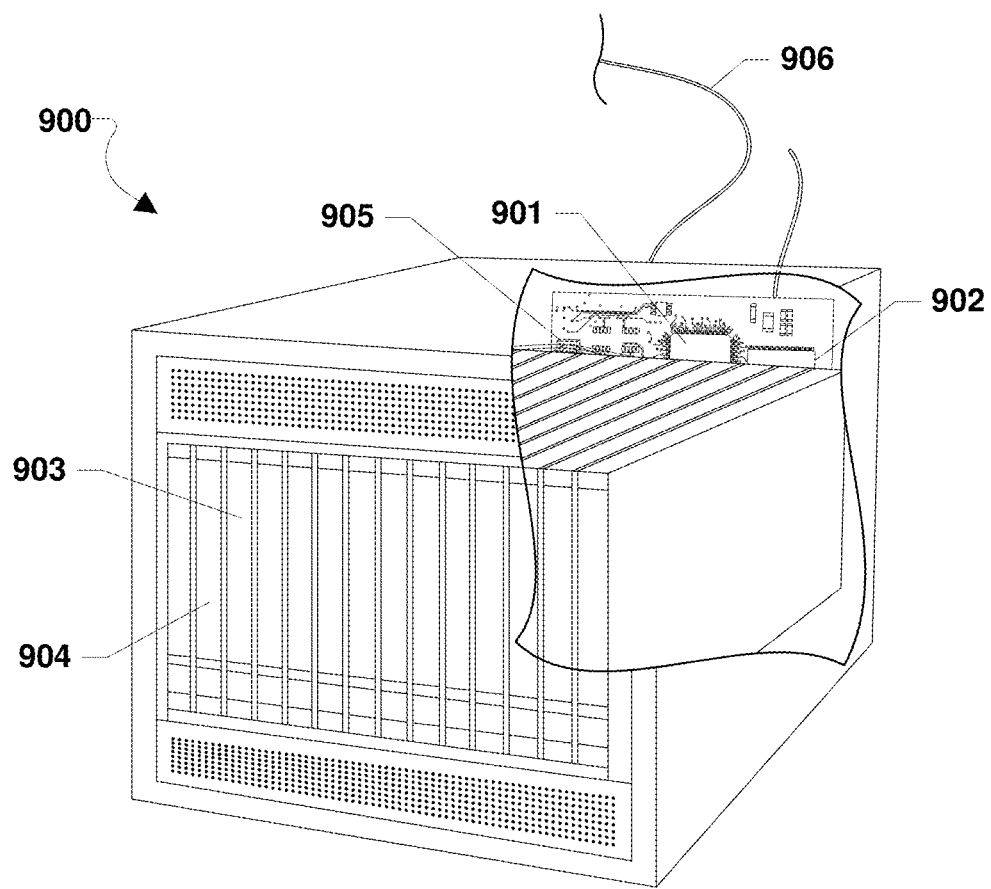
FIG. 9 is a component diagram of an example server suitable for use with the various embodiments.

Various embodiments (including, but not limited to, embodiments discussed above with reference to FIGS. 1A-8) may be implemented on any of a variety of commercially available server devices (e.g., 210, 312, 314, 316, 322, 324), which may be used/accessed by a target consumer (e.g., 5) and/or a content distributor network (e.g., 208), such as the server 900 illustrated in FIG. 9. The server 900 may include a processor 901 coupled to volatile memory 902 and a large capacity nonvolatile memory, such as a disk drive 903. The server 900 may also include a floppy disc drive, compact disc (CD) or DVD disc drive 904 coupled to the processor 901. The server 900 may also include network access ports 906 coupled to the processor 901 for establishing data connections with a network connection circuit 905 and a communication network (e.g., IP network) coupled to other communication system network elements.

The processors 206, 601, 701, 801, 901 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 206, 601, 701, 801, 901. The processors 206, 601, 701, 801, 901 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 206, 601, 701, 801, 901 including internal memory or removable memory plugged into the device and memory within the processors 206, 601, 701, 801, 901 themselves.

FIGS. 10A and 10B are schematic diagrams of direct feedback from a target consumer captured by one or more sensors on a set-top box suitable for use with the various embodiments. Optical sensors (e.g., camera 110) connected to a set-top box or the camera from a target user's smart phone may collect images of a target user to detect characteristics of body features that enable that target consumer to more easily provide user input to the computing system (e.g., 200). In this way, various embodiments may scan for changes in facial expressions, poses, and/or other body language, including a disapproving nod, laughter, or hand signals (e.g., thumbs up/down). This type of user input may be supplied to a user input receiving/storage module (e.g., 232) and consideration by the video content matching module (e.g., 238).

Referring to FIGS. 1A-10B and according to embodiments of the present disclosure, a method for delivering secondary video content is provided. The method for delivering secondary video content includes the operations of performing, at a processor of a computing device, an active video semantic analysis on a segment of a first video content presented on a viewing device, wherein the semantic analysis identifies an active video first visible element visible within the segment; matching, by the processor, a secondary video content, not directly related to the first video content, based on a prior semantic analysis on the secondary video content that identified a secondary-video first visible element therein that is associated with the active video first visible element from the segment; and presenting, on the viewing device immediately after the segment, the secondary video content.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a module may be, but is not limited to, a process running on a processor, a processor, an object, an executable, a thread of execution, a program, or a computer. By way of illustration, both an application running on a computing device and the computing device may be referred to as a module. One or more modules may reside within a process or thread of execution and a module may be localized on one processor or core or distributed between two or more processors or cores. In addition, these modules may execute from various non-transitory processor-readable storage media having various instructions or data structures stored thereon. Modules may communicate by way of local or remote processes, function or procedure calls, electronic signals, data packets, memory read/writes, and other known network, computer, processor, or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable storage media. Additionally, the operations of a method or algorithm may reside as one or any combination or set of codes and/or instructions on a non-transitory server-readable, processor-readable medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for delivering secondary video content, comprising:

performing, at a processor of a computing device, an active video semantic analysis on a segment of a first video content presented on a viewing device, wherein the active video semantic analysis identifies an active video first visible element visible within the segment;

matching, by the processor, a secondary video content, not directly related to the first video content, based on a prior semantic analysis on the secondary video content that identified a secondary-video first visible element therein that is associated with the active video first visible element from the segment; and presenting, on the viewing device immediately after the segment, the secondary video content, wherein the secondary video content is presented as an interruption of the first video content, before resuming a presentation of the first video content on the viewing device after the conclusion of the secondary video content, wherein the segment of the first video content takes place during the first video content within 3 to 5 minutes before the interruption.

2. The method of claim 1, wherein the active video semantic analysis further identifies an active video second visible element, within the segment, that interacts with the active video first visible element.

3. The method of claim 1, wherein the active video semantic analysis further identifies a plurality of active video visible elements, within the segment.

4. The method of claim 1, wherein the active video semantic analysis further identifies an interaction between the active video first visible element and at least one other active video elements visible within the segment.

5. The method of claim 1, further comprising:
performing a secondary video semantic analysis of a plurality of secondary video content candidates; and
allotting a preferred weighting to any of the plurality of secondary video content candidates that includes the secondary-video first visible element, wherein the matching secondary video content includes a highest weighting.

6. The method of claim 5, further comprising:
adjusting the weighting of a select one or more of the plurality of secondary video content candidates, based on secondary modifiers not related to the content of the select one or more of the plurality of secondary video content candidates.

7. The method of claim 5, further comprising:
adjusting the weighting of a select one or more of the plurality of secondary video content candidates, based on a user input/preference that is associated with the select one or more of the plurality of secondary video content candidates.

8. The method of claim 5, further comprising:
adjusting the weighting of a select one or more of the plurality of secondary video content candidates, based on metadata in at least one of the segment of the first video content or the select one or more of the plurality of secondary video content candidates.

9. The method of claim 1, further comprising:
performing a semantic analysis of a plurality of secondary video content candidates; and
allotting a preferred weighting to any of the plurality of secondary video content candidates associated with a category of element to which the secondary-video first visible element belongs, wherein the matching secondary video content is associated with the category of element.

10. The method of claim 1, further comprising:
performing a semantic analysis of a plurality of secondary video content candidates, wherein the semantic analysis of both the segment of the first video content and each of the plurality of secondary video content candidates is configured to identify one or more active video second visible elements visible therein, wherein the matching secondary video content includes the most active video second visible elements in common with the segment of the first video content.

11. The method of claim 1, further comprising:
performing an audio content analysis of the segment of the first video content to determine at least one key audio element of the first video content, wherein the matching secondary video content is associated with the at least one key audio element.

12. The method of claim 1, further comprising:
performing a text analysis on text visible in the segment of the first video content to determine at least one key textual element of the first video content, wherein the matching secondary video content is associated with the at least one key textual element.

13. A computing device, comprising:
a transceiver; and
a processor coupled to the transceiver, wherein the processor is configured with processor-executable instructions to perform operations for delivering secondary video content, the operations comprising:
performing an active video semantic analysis on a segment of a first video content presented on a viewing device, wherein the active video semantic analysis identifies an active video first visible element visible within the segment;
matching a secondary video content, not directly related to the first video content, based on a prior semantic analysis on the secondary video content that identified a secondary-video first visible element therein that is associated with the active video first visible element from the segment; and
presenting, on the viewing device immediately after the segment, the secondary video content, wherein the secondary video content is presented as an interruption of the first video content, before resuming a presentation of the first video content on the viewing device after the conclusion of the secondary video content, wherein the segment of the first video content takes place during the first video content within 3 to 5 minutes before the interruption.

14. The computing device of claim 13, wherein the processor is configured with processor-executable instructions to perform operations such that the active video semantic analysis further identifies an active video second visible element, within the segment, that interacts with the active video first visible element.

15. The computing device of claim 13, wherein the processor is configured with processor-executable instructions to perform operations such that the active video semantic analysis further identifies a plurality of active video visible elements, within the segment.

16. The computing device of claim 13, wherein the processor is configured with processor-executable instructions to perform operations such that the active video semantic analysis further identifies an interaction between the active video first visible element and at least one other active video elements visible within the segment.

17. The computing device of claim 13, wherein the processor is configured with processor-executable instructions to perform operations further comprising:
performing a secondary video semantic analysis of a plurality of secondary video content candidates; and
allotting a preferred weighting to any of the plurality of secondary video content candidates that includes the secondary-video first visible element, wherein the matching secondary video content includes a highest weighting.

18. The computing device of claim 17, wherein the processor is configured with processor-executable instructions to perform operations further comprising:
adjusting the weighting of a select one or more of the plurality of secondary video content candidates, based on secondary modifiers not related to the content of the select one or more of the plurality of secondary video content candidates.

19. The computing device of claim 17, wherein the processor is configured with processor-executable instructions to perform operations further comprising:
adjusting the weighting of a select one or more of the plurality of secondary video content candidates, based on a user input/preference that is associated with the select one or more of the plurality of secondary video content candidates.

20. The computing device of claim 17, wherein the processor is configured with processor-executable instructions to perform operations further comprising:
adjusting the weighting of a select one or more of the plurality of secondary video content candidates, based on metadata in at least one of the segment of the first video content or the select one or more of the plurality of secondary video content candidates.

21. The computing device of claim 13, wherein the processor is configured with processor-executable instructions to perform operations further comprising:
performing a semantic analysis of a plurality of secondary video content candidates; and
allotting a preferred weighting to any of the plurality of secondary video content candidates associated with a category of element to which the secondary-video first visible element belongs, wherein the matching secondary video content is associated with the category of element.

22. The computing device of claim 13, wherein the processor is configured with processor-executable instructions to perform operations further comprising:
performing a semantic analysis of a plurality of secondary video content candidates, wherein the semantic analysis of both the segment of the first video content and each of the plurality of secondary video content candidates is configured to identify one or more active video second visible elements visible therein, wherein the matching secondary video content includes the most active video second visible elements in common with the segment of the first video content.

23. The computing device of claim 13, wherein the processor is configured with processor-executable instructions to perform operations further comprising:
performing an audio content analysis of the segment of the first video content to determine at least one key audio element of the first video content, wherein the matching secondary video content is associated with the at least one key audio element.

24. The computing device of claim 13, wherein the processor is configured with processor-executable instructions to perform operations further comprising:
performing a text analysis on text visible in the segment of the first video content to determine at least one key textual element of the first video content, wherein the matching secondary video content is associated with the at least one key textual element.

25. A non-transitory processor-readable storage medium having stored thereon processor-executable instructions configured to cause a processor to perform operations for delivering secondary video content, the operations comprising:
performing an active video semantic analysis on a segment of a first video content presented on a viewing device, wherein the active video semantic analysis identifies an active video first visible element visible within the segment;
matching a secondary video content, not directly related to the first video content, based on a prior semantic analysis on the secondary video content that identified a secondary-video first visible element therein that is associated with the active video first visible element from the segment; and
presenting, on the viewing device immediately after the segment, the secondary video content, wherein the secondary video content is presented as an interruption of the first video content, before resuming a presentation of the first video content on the viewing device after the conclusion of the secondary video content, wherein the segment of the first video content takes place during the first video content within 3 to 5 minutes before the interruption.

* * * * *